(12) United States Patent
Morgenstern et al.

(10) Patent No.: US 10,450,193 B2
(45) Date of Patent: Oct. 22, 2019

(54) ALCOHOL REFORMER FOR REFORMING ALCOHOL TO MIXTURE OF GAS INCLUDING HYDROGEN

(71) Applicant: Monsanto Technology LLC, St. Louis, MO (US)

(72) Inventors: David A. Morgenstern, St Louis, MO (US); Erik D. Sall, St Louis, MO (US); Roger C. Smith, Ann Arbor, MI (US); Brian Odell Ralph, Northville, MI (US)

(73) Assignee: Monsanto Technology LLC, St. Louis, MO (US)

( * ) Notice: Subject to any disclaimer, the term of this patent is extended or adjusted under 35 U.S.C. 154(b) by 124 days.

(21) Appl. No.: 14/389,683

(22) PCT Filed: Mar. 29, 2013

(86) PCT No.: PCT/US2013/034553
§ 371 (c)(1),
(2) Date: Sep. 30, 2014

(87) PCT Pub. No.: WO2013/149118
PCT Pub. Date: Oct. 3, 2013

(65) Prior Publication Data
US 2016/0023898 A1    Jan. 28, 2016

Related U.S. Application Data

(60) Provisional application No. 61/618,045, filed on Mar. 30, 2012, provisional application No. 61/788,376, filed on Mar. 15, 2013.

(51) Int. Cl.
*B01J 19/24* (2006.01)
*C01B 3/22* (2006.01)
(Continued)

(52) U.S. Cl.
CPC .............. *C01B 3/22* (2013.01); *B01J 8/0085* (2013.01); *B01J 8/0221* (2013.01); *B01J 8/0285* (2013.01);
(Continued)

(58) Field of Classification Search
CPC combination set(s) only.
See application file for complete search history.

(56) References Cited

U.S. PATENT DOCUMENTS 2,625,470 A * 1/1953 Roberts, Jr. .............. B01J 8/062
423/652
4,420,462 A 12/1983 Clyde
(Continued)

FOREIGN PATENT DOCUMENTS

CN 101529075 A 9/2009
DE 10346267 A1 4/2005
(Continued)

OTHER PUBLICATIONS

Emonts, B., et al., "Fuel Cell Drive System with Hydrogen Generation in Test," 2000, J Power Sources, 86:228-236.
(Continued)

*Primary Examiner* — Kaity V Chandler
(74) *Attorney, Agent, or Firm* — Stinson LLP; James E. Davis

(57) ABSTRACT

Reforming alcohol is disclosed. Alcohol is introduced into a conduit of an alcohol reformer so that the alcohol flows through a catalyst stage within the conduit. The catalyst stage includes an alcohol reforming catalyst, and a heat transfer member comprising thermally conductive material. The heat transfer member is in thermal contact with the conduit and the alcohol reforming catalyst. Simultaneously, exhaust gas is introduced from an internal combustion engine into an exhaust channel. The exhaust gas in the exhaust channel contacts fins extending outward from the conduit so that heat from the exhaust gas is transferred through the fins, the conduit, and the heat transfer member to the alcohol reforming catalyst.

18 Claims, 23 Drawing Sheets

(51) Int. Cl.

| | | |
|---|---|---|
| *C10L 3/00* | (2006.01) | |
| *B01J 8/06* | (2006.01) | |
| *C01B 3/26* | (2006.01) | |
| *B01J 8/04* | (2006.01) | |
| *B01J 8/00* | (2006.01) | |
| *B01J 8/02* | (2006.01) | |
| *F02M 27/02* | (2006.01) | |

(52) U.S. Cl.
CPC ........... *B01J 8/0292* (2013.01); *B01J 8/0438* (2013.01); *B01J 8/0442* (2013.01); *B01J 8/0496* (2013.01); *B01J 8/067* (2013.01); *B01J 19/24* (2013.01); *B01J 19/2495* (2013.01); *C01B 3/26* (2013.01); *C10L 3/00* (2013.01); *B01J 2208/0084* (2013.01); *B01J 2208/00221* (2013.01); *B01J 2208/00513* (2013.01); *B01J 2208/00849* (2013.01); *B01J 2219/00038* (2013.01); *B01J 2219/00076* (2013.01); *B01J 2219/24* (2013.01); *C01B 2203/0244* (2013.01); *C01B 2203/0277* (2013.01); *C01B 2203/0833* (2013.01); *C01B 2203/107* (2013.01); *C01B 2203/1029* (2013.01); *C01B 2203/1058* (2013.01); *C01B 2203/1076* (2013.01); *C01B 2203/1217* (2013.01); *C01B 2203/1223* (2013.01); *C01B 2203/1288* (2013.01); *C01B 2203/143* (2013.01); *C10L 2290/06* (2013.01); *F02M 27/02* (2013.01)

(56) References Cited

U.S. PATENT DOCUMENTS

| | | | |
|---|---|---|---|
| 5,253,993 A | | 10/1993 | Birkenstock et al. |
| 5,627,125 A | | 5/1997 | Ebner et al. |
| 5,689,000 A | | 11/1997 | Ebner et al. |
| 5,904,913 A | * | 5/1999 | Bohm ................ B01B 1/005 252/373 |
| 5,916,840 A | | 6/1999 | Ebner et al. |
| 6,255,357 B1 | * | 7/2001 | Abbott ............... C01B 3/382 518/700 |
| 6,573,213 B1 | | 6/2003 | Ostgard et al. |
| 7,179,313 B2 | | 2/2007 | Retallick et al. |
| 7,682,724 B2 | | 3/2010 | Morgenstern |
| 8,100,083 B2 | | 1/2012 | Morgenstern |
| 8,100,093 B2 | | 1/2012 | Morgenstern |
| 2002/0146359 A1 | * | 10/2002 | Lomax, Jr. ............ B01J 8/0005 423/652 |
| 2003/0173062 A1 | * | 9/2003 | Lomax, Jr. ............ B01J 8/008 165/82 |
| 2006/0224027 A1 | | 10/2006 | Turek et al. |
| 2007/0028860 A1 | | 2/2007 | Hemsath |
| 2007/0082236 A1 | * | 4/2007 | Lee ..................... B01J 23/16 429/423 |
| 2008/0010993 A1 | * | 1/2008 | Morgenstern ......... C01B 3/323 60/780 |
| 2008/0210596 A1 | * | 9/2008 | Litt ................... B01J 19/0093 208/20 |
| 2009/0104110 A1 | * | 4/2009 | Peng .................. B01J 8/008 423/652 |
| 2010/0254891 A1 | | 10/2010 | Giroudiere et al. |
| 2010/0329947 A1 | * | 12/2010 | Fischel ................ B01J 10/007 422/198 |
| 2011/0132283 A1 | | 6/2011 | Czekala et al. |
| 2011/0132284 A1 | | 6/2011 | Leone et al. |
| 2011/0132285 A1 | | 6/2011 | Pursifull |
| 2011/0132286 A1 | | 6/2011 | Leone et al. |
| 2011/0132288 A1 | | 6/2011 | Pursifull |
| 2011/0132289 A1 | | 6/2011 | Pursifull et al. |
| 2011/0132290 A1 | | 6/2011 | Leone et al. |
| 2011/0132306 A1 | | 6/2011 | Kerns et al. |
| 2011/0132321 A1 | | 6/2011 | Pursifull |
| 2011/0132323 A1 | | 6/2011 | Surnilla et al. |
| 2011/0132326 A1 | | 6/2011 | Leone |
| 2011/0137537 A1 | | 6/2011 | Leone |
| 2012/0097117 A1 | | 4/2012 | Morgenstern |
| 2012/0277327 A1 | * | 11/2012 | Han .................... B01J 8/067 518/702 |
| 2013/0025547 A1 | | 1/2013 | Nakagawa et al. |

FOREIGN PATENT DOCUMENTS

| | | |
|---|---|---|
| EP | 1691065 A1 | 8/2006 |
| JP | 61175245 | 6/1986 |
| WO | 2006045644 A1 | 5/2006 |
| WO | 2007018992 A2 | 2/2007 |
| WO | 2007118950 A1 | 10/2007 |
| WO | 2011088982 A1 | 7/2011 |
| WO | 2012135583 A1 | 10/2012 |

OTHER PUBLICATIONS

International Search Report dated Aug. 27, 2012, issued in PCT/US2012/031382, 8 pages.
International Preliminary Report on Patentability dated Oct. 10, 2013, issued in PCT/US2012/031382, 12 pages.
International Search Report dated Jul. 15, 2013, issued in PCTY/US2013/034553, 5 pages.
International Preliminary Report on Patentability dated Oct. 9, 2013, issued in PCT/US2013/034553, 9 pages.
International Search Report dated Aug. 14, 2013, issued in PCT/US2013/034545, 4 pages.
International Preliminary Report on Patentability dated Oct. 9, 2014, issued in PCT/US2013/034545, 6 pages.

* cited by examiner

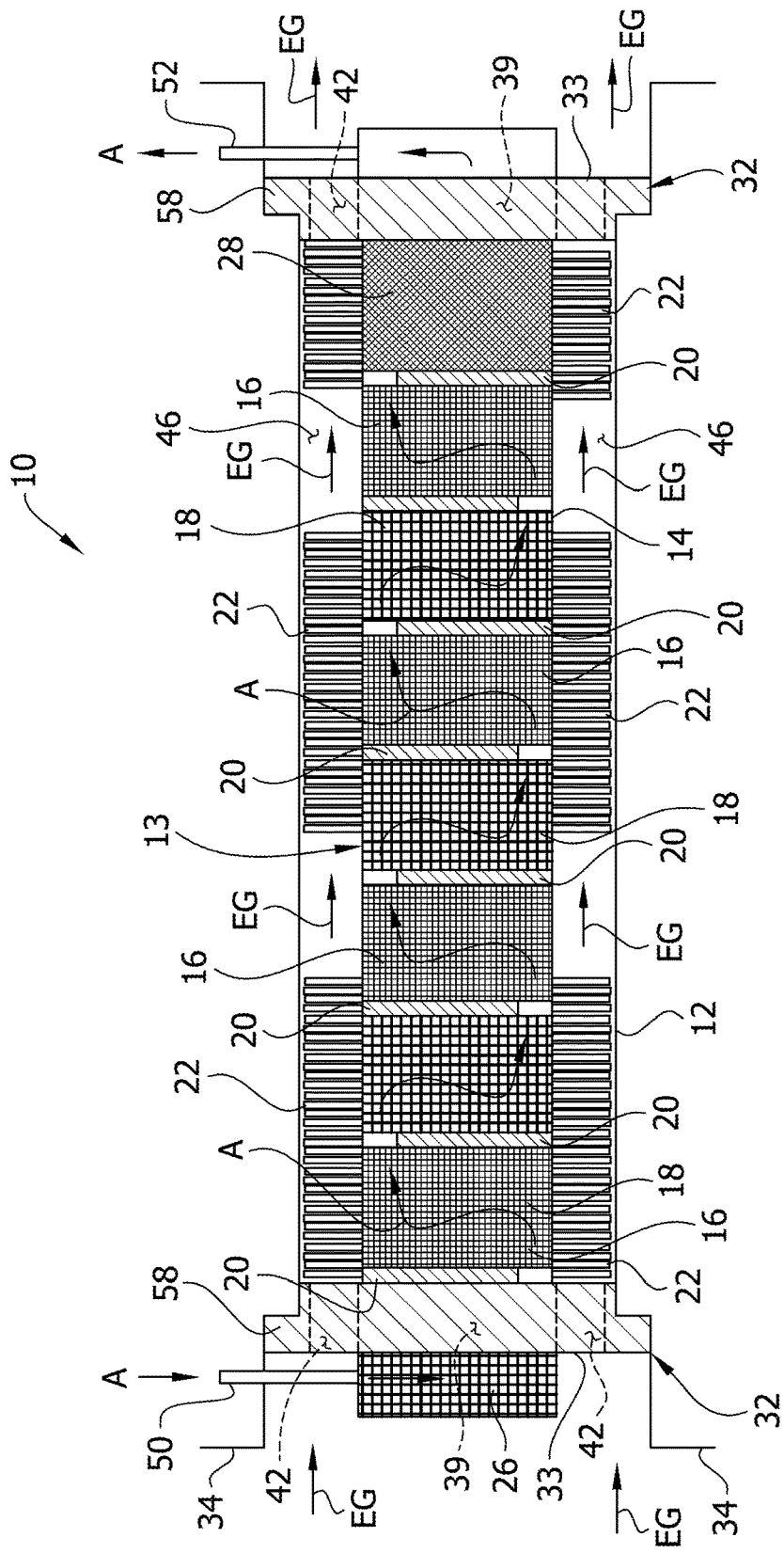

ALCOHOL REFORMER FOR REFORMING ALCOHOL TO MIXTURE OF GAS INCLUDING HYDROGEN

FIELD OF THE DISCLOSURE

The present disclosure generally relates to an alcohol reformer for reforming alcohol to a mixture of gas including hydrogen and a method for performing the same.

BACKGROUND OF THE DISCLOSURE

Alcohol reforming can be an endothermic catalytic process that converts alcohols to a mixture of hydrogen and other gases. The product, "alcohol reformate," is superior to the parent alcohol as a fuel for internal combustion engines. The superiority of alcohol reformate, particularly those formed from methanol and ethanol, is primarily due to the presence of hydrogen. Reformate burns faster than the starting alcohol and is more tolerant of dilution with air or exhaust. At part load, dilution benefits efficiency by reducing throttling losses and loss of heat of combustion to the coolant. In addition, the heat of combustion of reformate is greater than that of the starting alcohol. Both alcohols and reformate are high octane fuels which can tolerate high compression ratios.

SUMMARY OF THE DISCLOSURE

In one aspect, an alcohol reformer generally comprises a conduit including a wall having an exterior surface and an interior surface at least partially defining an interior chamber through which alcohol vapor flows along an alcohol flow path, the conduit wall comprising a thermally conductive material; a plurality of fins extending generally radially outward from the exterior surface of the conduit wall, the fins comprising thermally conductive material, wherein the fins and the conduit wall are in thermal contact; a catalyst stage in the interior chamber of the conduit, wherein the catalyst stage is configured to allow alcohol vapor to flow through the catalyst stage along the alcohol flow path, the catalyst stage including an alcohol reforming catalyst, and a heat transfer member comprising thermally conductive material, wherein the heat transfer member is in thermal contact with the conduit wall and the alcohol reforming catalyst, whereby heat is transferable from the plurality of fins to the alcohol reforming catalyst to enable reforming of the alcohol vapor as it flows through the catalyst stage.

In another aspect, an alcohol reforming system generally comprises an outer reformer housing defining a generally horizontal exhaust channel through which exhaust gas flows along an exhaust gas path; and an alcohol reformer received in the exhaust channel, the reformer including: a conduit including a wall having an exterior surface and an interior surface at least partially defining an interior chamber through which alcohol vapor flows along an alcohol flow path, wherein the conduit wall comprising a thermally conductive material, the interior chamber being free from fluid communication with the exhaust channel; a plurality of fins extending generally radially outward from the exterior surface of the conduit wall and located within the exhaust channel, the fins comprising thermally conductive material, wherein the fins and the conduit wall are in thermal contact; and a catalyst stage in the interior chamber of the conduit, wherein the catalyst stage is configured to allow alcohol vapor to flow through the catalyst stage along the alcohol flow path. The catalyst stage includes an alcohol reforming catalyst, and a heat transfer member comprising thermally conductive material, wherein the heat transfer member is in thermal contact with the conduit wall and the alcohol reforming catalyst, whereby heat from the exhaust gas flowing in the exhaust chamber is transferable from the plurality of fins to the alcohol reforming catalyst to enable reforming of the alcohol vapor as it flows through the catalyst stage.

In yet another aspect, a method of reforming an alcohol generally comprises introducing an alcohol into a conduit of an alcohol reformer so that the alcohol flows through a catalyst stage within the conduit, the catalyst stage including an alcohol reforming catalyst, and a heat transfer member comprising thermally conductive material, wherein the heat transfer member is in thermal contact with the conduit and the alcohol reforming catalyst; and delivering, simultaneously with said introducing an alcohol, exhaust gas from an internal combustion engine into an exhaust channel, wherein the exhaust gas in the exhaust channel contacts fins extending outward from the conduit so that heat from the exhaust gas is transferred through the fins, the conduit, and the heat transfer member to the alcohol reforming catalyst.

Other features will be in part apparent and in part pointed out hereinafter.

BRIEF DESCRIPTION OF THE DRAWINGS

FIG. 1 is a schematic section of an embodiment of a reformer system;

Corresponding reference characters indicate corresponding parts throughout the drawings.

DETAILED DESCRIPTION

Figure 3:
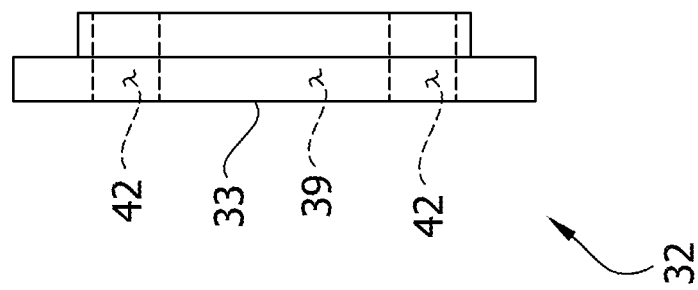
FIG. 3 is a right elevational view of the end fitting in FIG. 2.

The superiority of alcohol reformate as a fuel for internal combustion engines, particularly those formed from methanol and ethanol, is primarily due to the presence of hydrogen. Reformate burns faster than the starting alcohol and is more tolerant of dilution with air or exhaust. In the case of excess air, the degree of dilution is typically described by the parameter lambda ($\lambda$) which represents the ratio of air introduced into the cylinders to that required stoichiometrically for combustion of the fuel. The use of excess air ($\lambda>1$) disables the catalytic converter's ability to control $NO_x$, a priority pollutant. However, relatively high $\lambda$ values, particularly when combined with some level of exhaust gas recirculation (EGR) suppresses $NO_x$ levels out of the engine. These levels are low enough that target tailpipe $NO_x$ emissions can be achieved by using a small lean $NO_x$ trap.

Methanol reforming is typically conducted at temperatures above 250° C. The methanol reforming reaction is given in equation 1.

$$CH_3OH \rightarrow CO + 2H_2 \qquad (1)$$

It has been reported, for example in U.S. Pat. Nos. 7,682,724 B2 and 8,100,093 B2, that a copper-plated nickel sponge catalyst is active and stable for reforming of ethanol above 250° C. via the pathway shown in equation 2. The catalyst is also effective for methanol reforming according to equation 1.

$$CH_3CH_2OH \rightarrow CH_4 + CO + H_2 \qquad (2)$$

Copper-plated nickel sponge is an unsupported metal catalyst. Catalyst supports help to maintain the dispersion of the active metal and structured supports can prevent catalyst movement, but they represent unproductive thermal mass. In vehicular applications, it is advantageous to bring the reforming catalyst to operating temperature quickly so that the engine can operate on reformate throughout almost the entire drivecycle.

Similarly, minimizing the thermal mass of other reformer components may be necessary in order to achieve acceptable heatup times. For example, Emonts et al. report a minimum heatup time of 22 minutes using a 12 kW methanol burner before a 50 kW methanol reformer reaches reaction temperature (B. Emonts et. al., J. Power Sources, vol. 86, pp. 228-36, 2000).

While it may be necessary to minimize the thermal mass of the reformer, this cannot be achieved by making the components of the reformer arbitrarily thin. Practical powertrains utilizing reformed alcohols preferably incorporate a buffer tank which stores reformate required for vehicle cold start and high power transients. Pressurizing the reformate in the buffer tank enables the tank to be smaller, making it easier to package onboard a vehicle. In addition, fuel injectors used to introduce reformate into the engine require several atmospheres of driving pressure. If a powder catalyst is used in the reformer, pressure drop through the catalyst bed creates further backpressure. Thus, although the exact requirements depend on the vehicle design and engine strategy, a practical onboard alcohol reformer should be able to operate safely with backpressures from about 100 to about 150 psi at the relevant process temperatures, typically up to about 350° C. on the catalyst side and up to about 700° C. on the exhaust side.

A second metric of alcohol reformer performance is the effectiveness of heat transfer from exhaust to catalyst. High heat transfer efficiency enables rapid reformer startup, but, dilution in the engine cylinder reduces exhaust temperatures, particularly when excess air is used as the diluent. Relatively high in-cylinder dilution can be tolerated when reformer heat transfer efficiency is high, enabling the engine to achieve higher efficiency.

An additional issue arises for reforming catalysts containing nickel. An undesired side reaction, "methanation," is catalyzed by nickel at comparatively high temperatures. The methanation reaction, shown in equation 3, destroys hydrogen, thus limiting the dilution which can be achieved in the engine while also reducing the enthalpy of combustion of reformate. Using copper-plated nickel catalysts, it has been found that it is preferable to maintain catalyst temperature below about 370° C. and more preferably below about 350° C. in order to suppress methanation. Ideally, the temperature distribution of the catalyst mass is maintained as close to isothermal as possible so that all of the catalyst can maintain high activity and none is in the methanation temperature range.

$$3H_2 + CO \rightarrow CH_4 + H_2O \qquad (3)$$

The present disclosure relates to a method for improving efficiency and emissions of an alcohol-fueled vehicle by utilizing exhaust heat to drive the endothermic, catalytic alcohol reforming reaction. This reaction converts the alcohols, typically methanol and ethanol, to a mixture of gases including hydrogen which can be utilized in the engine with high efficiency. The reforming process requires maintaining high catalytic activity as well as adequate heat transfer from exhaust to catalyst. In one embodiment, the present disclosure comprises reformers using copper-nickel catalysts with high reforming activity and a design which provides good heat transfer from exhaust to catalyst while minimizing thermal mass, enabling rapid heatup of the reformer at catalyst startup.

At least some reformer embodiments of the present disclosure enable efficient heat transfer from exhaust to catalyst in a design with minimal thermal mass, but which can withstand the backpressure created by fuel injectors and the buffer tank. This is accomplished by use of fins on the exhaust side for heat transfer rather than the use of a shell-and-tube or other high thermal mass designs. At least some reformer embodiments of the present disclosure also enable the use of pelleted or other structured reforming catalysts by providing catalyst-side geometry that is compatible with incorporation of the catalyst and providing adequate heat transfer. Use of a finned design rather than, for example, a shell-and-tube, plate-and-frame or other common heat exchange geometries avoids the need to squeeze structured catalysts into the thin spaces between the heat exchanger plates or pack them around tubes.

At least some reformer embodiments of the present disclosure include multiple catalyst stages alternating with stages that incorporate heat transfer capability without catalyst. Reforming of alcohols is endothermic. An active reforming catalyst can enable reforming to proceed at such a high rate as to consume heat faster than it can be supplied from the exhaust. Dividing the catalyst into stages with intervening stages that enable reheating of the ethanol/reformate stream allows the catalyst to be maintained at an acceptable operating temperature throughout the reformer.

Blends of alcohol and gasoline can also be used as feeds to the reformers of the present disclosure. In particular, high level ethanol blends, typically called "E85" are suitable fuels.

At least some embodiments of reformers of the present disclosure include heat exchangers with copper-nickel catalyst on one side. For example, ethanol is supplied to the catalyst side and exhaust flows through the other. In some embodiments, a powder catalyst, preferably copper-plated nickel sponge is incorporated to provide reforming activity. When a powder catalyst is used, a metal mesh or felt (broadly, heat transfer medium or a heat transfer member) may be incorporated into the catalyst bed for heat transfer purposes and internal filters may be used to prevent catalyst movement within the reformer or escape of the catalyst. The present disclosure also enables the use of structured catalysts. In one example, the catalysts are unsupported structures comprised of copper-plated nickel sponge which have been formed into a suitable rigid shape, typically cylindrical.

Internal filters may serve primarily to prevent catalyst from escaping from the reformer, but can also function to prevent catalyst movement within the reformer, particularly if the catalyst is arranged in stages. Although sintered metal media can be used for this purpose, fibrous metal depth filter media such as Bekipor media from NV Bekaert SA, Zwevegem, Belgium and fibrous metal depth filters from Mott Corporation, Farmington, Conn. may be used. A filter may be placed just inside the reformate exit. In a staged design, a thinner filtration layer may be placed after each catalyst stage as well.

Augmentation of heat transfer is highly valuable because packed beds of particulates do not transmit heat by simple conduction like homogeneous solids. Heat transfer through particle beds is known to be quite slow. Example 3, below, describes a reformer with a large-diameter powder bed which illustrates poor radial heat transfer through the powder bed and the radial thermal gradient that results.

An exemplary method of providing heat transfer through the catalyst mass is to embed the catalyst into sheets of metal mesh or felt or to apply a layer to the surface of a thin sheet of metal mesh or felt (each of which is broadly considered a heat transfer member). Other fibrous metal media can be used such as the copper gauze described in Example 4, steel wool, or even loose metal fibers. Metal mesh sheets may be advantageous because copper-plated nickel sponge can be easily applied to the sheets and because the catalyst-loaded sheets then serve as convenient catalyst carriers during assembly of the reformer, providing a catalyst bed with high catalyst density and excellent thermal conductivity. Examples of suitable media include G-Mat, a Fecralloy mesh product from Micron Fiber-Tech of Debary, Fla. and Sinterflo F and M media from Porvair of Ashland, Va.

In one example, the catalyst can be loaded onto the mesh without passivation of catalyst or the mesh and without the use of aggressive and time-consuming techniques such as roller mills. Copper-nickel catalysts, particularly copper-plated nickel sponge, are weakly ferromagnetic if they have not been dried and passivated. The interparticle attraction causes slurries of unpassivated catalyst to have a thick consistency similar to peanut butter, allowing a thick layer of catalyst to be applied to the mesh, foil, or screen by manually spreading a heavy slurry (preferably at least 50% catalyst by weight) onto one or both external surfaces.

Sheets of mesh coated and/or impregnated with copper-nickel catalyst can be easily inserted into the reformers of the present disclosure. Alternatively, structured catalysts can be used. Preferably, the structured catalysts comprise copper and nickel and have high surface area, preferably greater than 10 $m^2/g$ as measured by the Brunauer-Emmett-Teller (BET) method in order to provide the required catalytic activity and minimal inert structural material (such as alumina) in order to minimize thermal mass and undesired side reactions catalyzed by the support. Alumina, a common catalyst support, catalyzes dehydration of ethanol to ethylene, which can lead to coking and can also catalyze ether formation from methanol, ethanol and other alcohols. Use of metallic supports minimizes side reactions and provides better thermal conductivity. Spraying of Raney alloy onto metal supports followed by activation and plating can provide such catalysts. Preparation of metal sponge catalysts on metal supports without plating is described in US publication 2006/0224027 by T. Turek et al, the portions of which relating to the preparation of metal sponge catalysts are incorporated herein by reference.

The catalysts may be high-surface area structures comprised of bonded particles of copper-nickel particles, preferably copper-plated nickel sponge. In one example, the catalysts are rigid, high surface area agglomerates of nickel sponge (Raney nickel) which have been plated with copper. Suitable catalysts include shaped hollow catalysts, such as hollow spheres, prepared by spraying Raney alloy and a binder onto polystyrene spheres, followed by combustion of the polystyrene and activation of the alloy. This technique is described by Ostgard et al. in U.S. Pat. No. 6,573,213 B1, the portions of which relating to this techniques are incorporated by reference herein. Alternatively, activated Raney catalyst powders in water can be pressed into cylindrical pellets as described by Birkenstock et al. in U.S. Pat. No. 5,253,993, the portions of which relating to this technique are incorporated by reference herein. In the latter case, it may be preferable to plate the nickel sponge with copper prior to forming the catalyst.

The reformers and reformer systems of the present disclosure may be operated with either co-current or counter-current flow of exhaust and ethanol. In one example, co-current (parallel) flow is used because it may lead to a more isothermal temperature distribution. Horizontal exhaust flow is also used because exhaust exits normal internal combustion engines horizontally and is discharged from the rear of the vehicle. Changing the direction of exhaust flow from horizontal to vertical and back may create exhaust back-pressure, thereby putting a parasitic load on the engine.

Exhaust flow through the reformer is preferably metered with a valve positioned downstream from the reformer so as to maintain a suitable catalyst temperature. In one embodiment, the metering valve is controlled so as to maintain the temperature of reformate exiting the reformer between about 300 and about 360° C. Higher reformate exit temperature (corresponding to higher catalyst temperature) is preferred at high engine load where the catalyst must maintain higher turnover rates. Downstream positioning of the valve may be employed because if the valve was upstream of the reformer it may represent additional thermal mass that would have to be heated before the reformer became operational.

In at least some embodiments, the reformers of the present disclosure consolidate the functions of alcohol vaporization and reforming into a single unit for convenient packaging onboard a vehicle and reduced thermal mass. Thus, in these embodiments it is not necessary to use a separate vaporizer. However, a separate compact heat exchanger may be incorporated into the system which provides heat exchange between the incoming alcohol fuel stream and reformate exiting the reformer. This provides partial vaporization of the fuel while cooling the reformate to near the boiling point of the fuel (typically about 80° C.), which simplifies reformate handling and delivery to the engine. A compact plate-and-frame "flat-plate" heat exchanger may be used for this purpose.

Referring to FIGS. 1-5, one embodiment of a reformer system is generally indicated at reference numeral 10. In general, the reformer system 10 comprises an outer reformer housing 12, which in the present embodiment is an exhaust sleeve (e.g., a tube or pipe), through which exhaust gas EG from the exhaust system flows (as shown by arrows in FIG. 1) along a generally horizontal path, and an inner reformer, generally indicated at 13, that is generally coaxially received in the outer exhaust sleeve and through which alcohol A (i.e., alcohol vapor) flows (as shown by arrows in FIG. 1). Although it is understood that alcohol may not be fully vaporized when entering the reformer 13 or even when in the reformer, and at least a portion of the alcohol will be reformed into a reformate mixture (e.g., a mixture including hydrogen gas and liquid) as it flows through the reformer, the present disclosure refers to the fluid entering and exiting the reformer as "alcohol." The inner reformer 13 includes a reformer conduit 14 (e.g., a pipe or tube) having opposite closed longitudinal ends, a wall having an exterior surface and an interior surface at least partially defining an interior chamber through which alcohol vapor A flows along an alcohol flow path. A plurality of alternating catalyst stages 16 and reheat stages 18 are disposed within the chamber of the reformer conduit 14. The catalyst stages 16 may comprise, for example, either a powder copper-nickel catalyst embedded in a metal mesh or small copper-nickel pellets, such as described above herein. When using copper-nickel pellets, the catalyst pellets may measure from about 2 to about 6 mm, which provides a balance between heat transfer, mechanical strength, and even alcohol flow distribution. Small internal filters (not shown in FIG. 1) may be positioned directly downstream of each catalyst stage to prevent movement of powder (including powder from attrition of structured catalyst) and to cushion catalyst pellets against vibration.

Figure 4A:
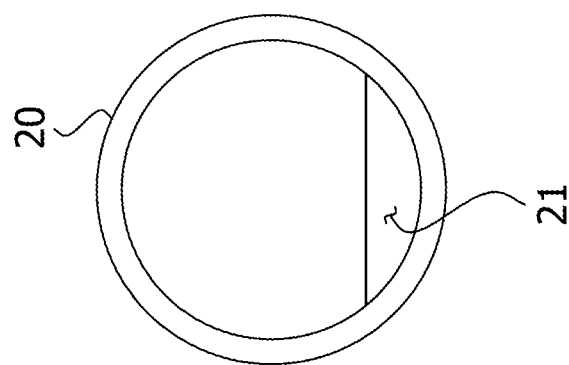
FIG. 4A is a front elevational view of the baffle in FIG. 4.
Figure 4:
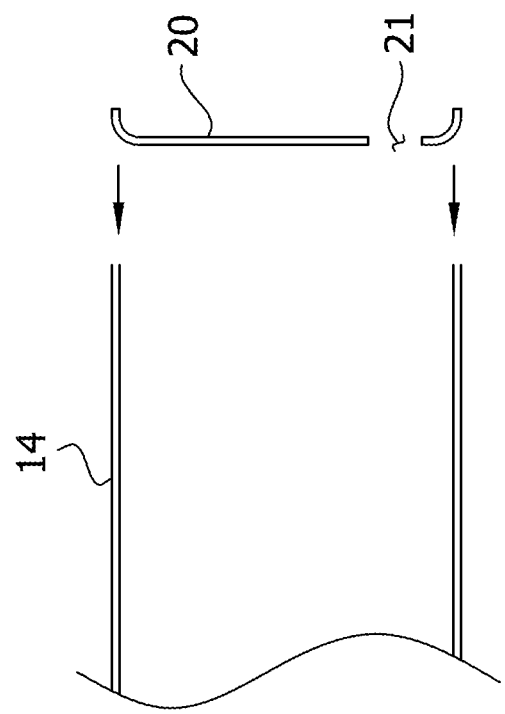
FIG. 4 is an exploded schematic of a baffle removed from a reformer of the reformer system.

The reheat stages 18 may comprise porous metal media such as metal foams, metal mesh, steel wool, or other thermally conductive material (broadly, heat transfer members) in thermal contact with the conduit 14. A plurality of baffles 20 are disposed in the reformer conduit 14 between the alternating catalyst and reheat stages 16, 18. Each baffle 20 includes an opening or notch 21 (FIGS. 4 and 4A) to allow alcohol vapor to flow past the baffle along the alcohol flow path, as depicted in FIG. 1. The baffles 20 may be substantially identical in shape, but alternate in rotational orientation relative to the reformer conduit 14 (such as shown in FIG. 1) to direct the alcohol vapor through the catalyst and reheat stages 16, 18 in alternating upflow and downflow directions (e.g., in a wave or sinusoidal-like flow path). The baffles 20 may be formed from copper because of its high thermal conductivity and the fact that it is flexible enough to be inserted even if the finned reformer conduit 14 or tube is slightly out of round. The baffles 20 may be formed from other thermally conductive material.

A plurality of fins 22 extend outward from and in thermal contact with the reformer conduit 14. The fins 22 are disposed within the flow path of the exhaust gas EG between the exterior of the reformer conduit 14 and the interior surface of the exhaust sleeve 12 to promote heat transfer from the exhaust gas toward the reformer conduit 14. In one embodiment, the fins 22 extend radially outward from the reformer conduit 14 and, in the illustrated example, are oriented in a spiral or helical configuration around the reformer conduit (i.e., about a longitudinal axis of the conduit). In another embodiment, the fins 22 may be configured to be parallel to the direction of exhaust EG flow. The fins 22 may be formed from steel, which will withstand the heat and corrosive compounds present in automotive exhaust, or copper, or other heat conductive material. Clearance between the ends of the fins 22 and the interior surface of the exhaust sleeve 12 may be less than 0.25 inches (6.25 mm) in order to minimize exhaust bypass. As the exhaust gas flows around the fins 22, heat is transferred through the fins to the conduit 14 and then to the catalyst stages 16 and reheat stages 18.

Figure 5:
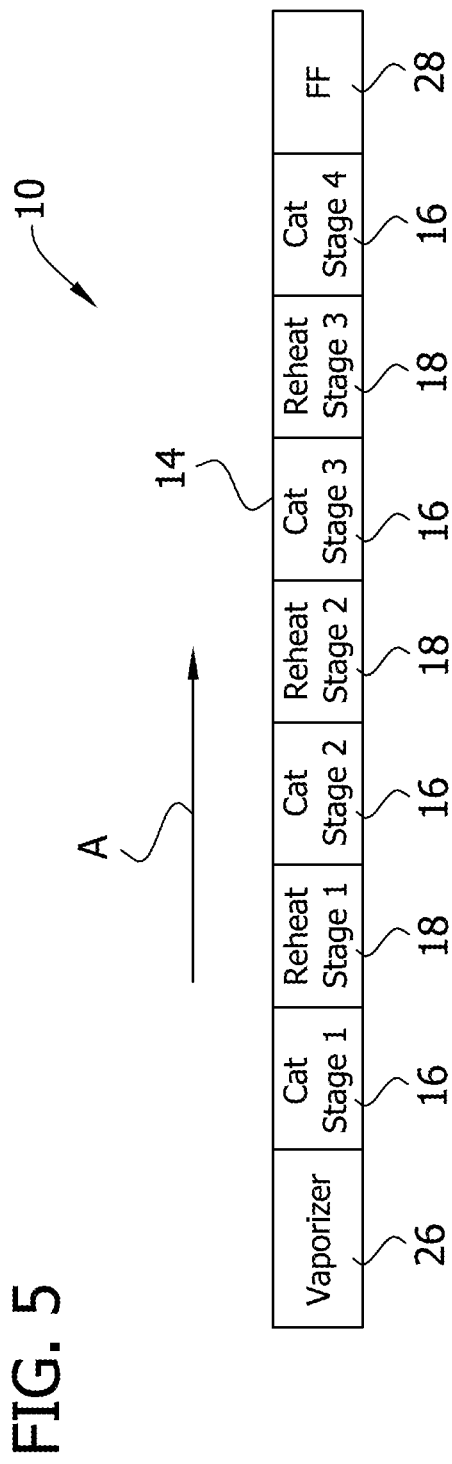
FIG. 5 is a schematic representation of reforming stages in the reformer of the reformer system in FIG. 1.

In the illustrated embodiment, upstream and downstream axial ends of the inner reformer conduit 14 are closed to inhibit the ingress of exhaust gas EG into the inner reformer conduit. As shown in FIG. 1, an alcohol inlet 50 (e.g., pipe or tube) extends radially through the reformer conduit 14 adjacent the upstream closed end, and an alcohol outlet 52 (e.g., pipe or tube) extends radially through the reformer conduit 14 adjacent the downstream closed end. Alcohol entering the reformer 13, more specifically the reformer conduit 14, first passes through a vaporizing stage 26 (i.e., a first stage) comprising porous media without catalyst, which serves to substantially complete vaporization and preheating of the alcohol and trap nonvolatile components of the feed, such as high-boiling components of gasoline when using E85 or similar gasoline-ethanol blends as a feed. In one example, the vaporizing stage 26 may include stainless steel wool, or other thermally conductive material. Also in this embodiment, a final or last stage 28 comprises a filter. A schematic depicting the arrangement of the reforming stages 16, 18, 26, 28 within the inner reformer conduit 14 is illustrated in FIG. 5.

Figure 2:
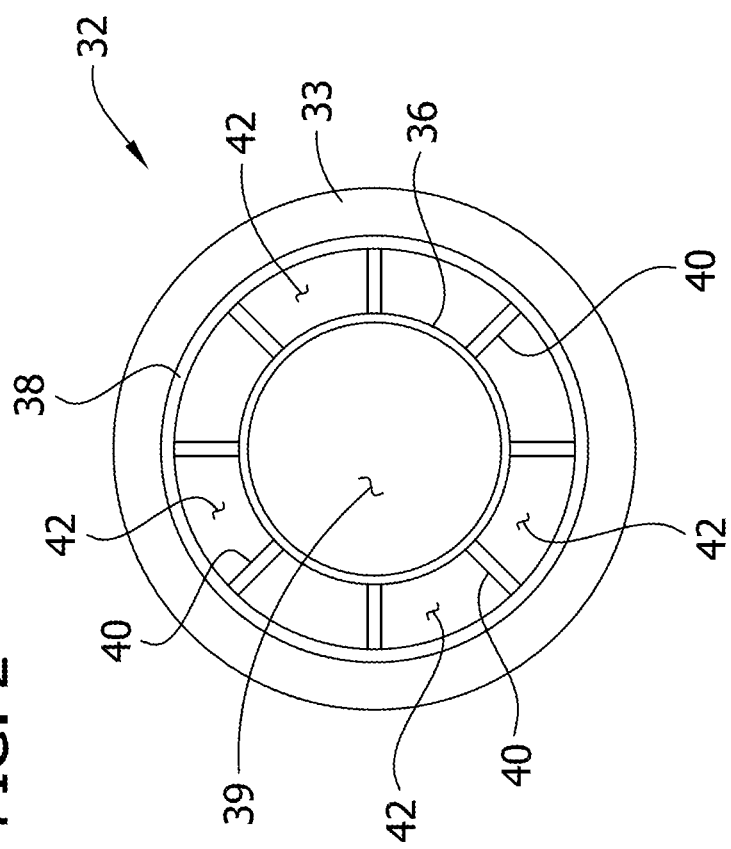
FIG. 2 is an enlarged front elevational view of an end fitting or cap for the reformer system in FIG. 1.

In the embodiment illustrated in FIGS. 1-4A, upstream and downstream end caps or fittings, generally indicated at 32, include bodies 33 that are inserted into open longitudinal ends of the outer exhaust sleeve 12, and securement flanges 34 (FIG. 1) for use in securing the reformer 10 to the exhaust system. Referring to FIG. 2, each body 33 includes concentric inner and outer rings 36, 38, respectively. A plurality of spokes or webs 40 extend radially outward from the inner ring 36 and interconnect the inner and outer rings 36, 38. The inner ring 36 defines a central opening 39 configured to receive and hold the reformer conduit 14 generally coaxially within the outer exhaust sleeve 12. Spaces 42 between the inner and outer rings 36, 38 and the webs 40 allow exhaust gas EG to flow within an exhaust gas passage 46 defined between the interior surface of the outer exhaust sleeve 12 and the exterior surface of the inner reformer conduit 14 (FIG. 1). The fitting body 33 includes a reduced diameter portion 58 that is received in and welded to corresponding open ends of the exhaust sleeve 12.

Figure 6:
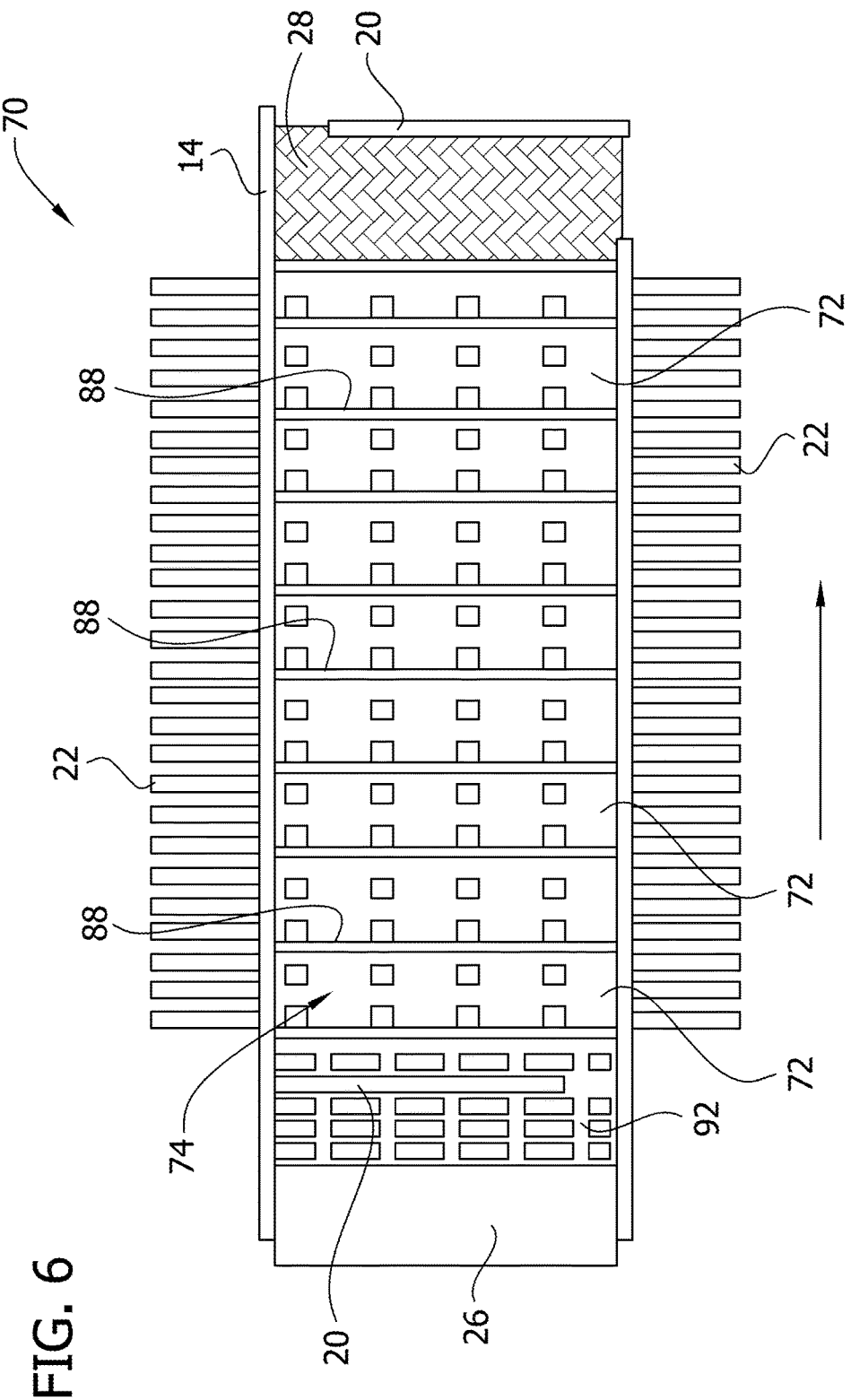
FIG. 6 is a schematic section through another embodiment of a reformer.
Figure 7:
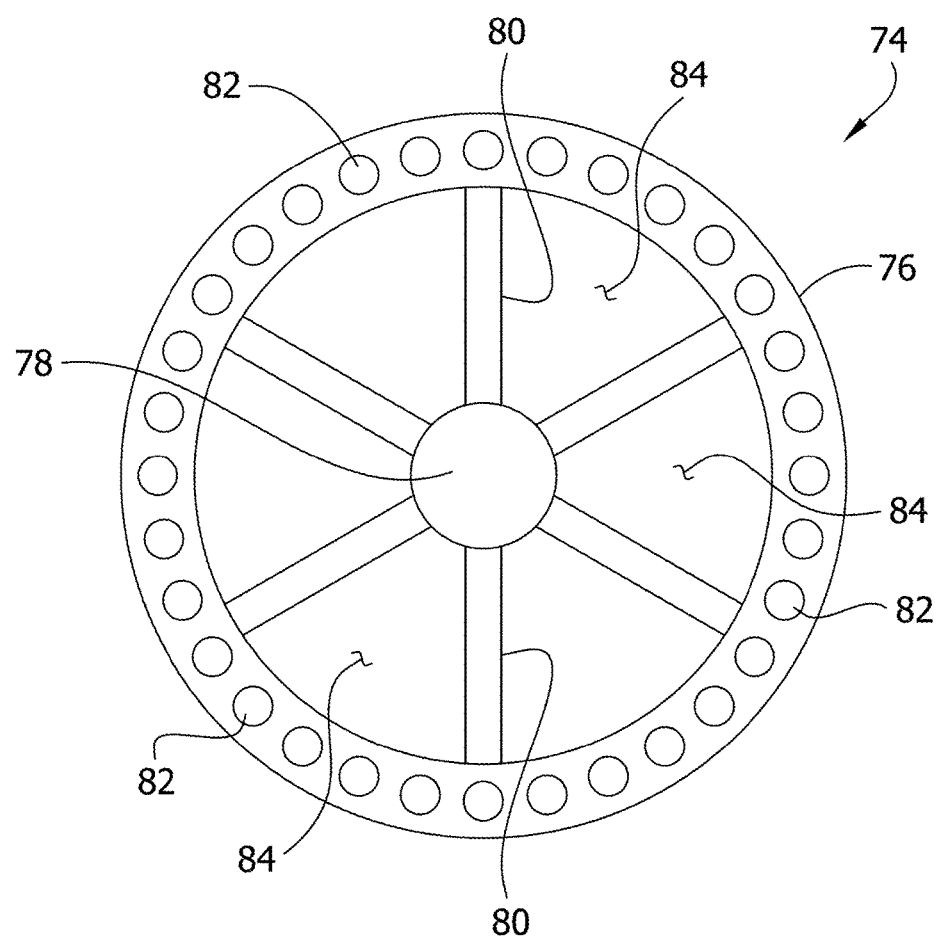
FIG. 7 is an enlarged front elevational view of a heat transfer element received in a reformer conduit of the reformer in FIG. 6.

Referring to FIG. 6, another embodiment of a reformer for use with the reformer system 10, or another reformer system, is generally indicated at 70. Unless otherwise described below, this embodiment is identical to the reformer 13 in the previous embodiment in FIGS. 1-4, with identical components indicated by the same reference numerals and having the same disclosure as set forth above. The main difference between the present reformer 70 and the reformer 13 of the previous embodiment is that each catalyst stage 72 of the present reformer 70 includes a heat transfer member, generally indicated at 74, that is different than the porous metal material in the previous embodiment. The heat transfer member 74 is in thermal contact with the conduit 14 for promoting heat transfer to the catalyst. In FIG. 6, a single catalyst stage 72 is shown, with the understanding that a plurality of catalyst stages may be included in the reformer 70. In one embodiment, the heat transfer member 74 comprises a wheel-like structure (FIG. 7) including an outer ring or rim 76, a hub 78, and a plurality of spokes or webs 80 extending radially outward from the hub 78 and interconnecting the hub and the rim. A plurality of teeth 82 extend outward from the rim 76. The heat transfer member 74 may be formed from copper or other thermally conductive material. In one example, the heat transfer member 74 is cut from ¼" copper sheet. The rim and spokes are ⅛" thick. The rim is ¹⁄₁₆" wide and its diameter fits just inside the finned conduit 14 (nominally 1.37").

Catalyst is received (e.g., packed) in the spaces 84 between the outer rim 76, the hub 78, and the plurality of webs 80 of the heat transfer member 74. As shown in FIG. 6, each catalyst stage 72 includes a plurality of heat transfer members 74 packed with catalyst, and thermally conductive mesh discs 88 (e.g., Fecralloy discs) intermediate adjacent heat transfer members 74. When using powder catalyst, the baffles 20 may be used to provide upflow through packed catalyst, and an internal filter 28, such as a layer of Bekipor media, is located downstream of the catalyst stage 72 to prevent catalyst movement. Several metal mesh disks 92 loaded with catalyst are positioned near the inlet of the conduit 14. The purpose of this additional catalyst is to fill any gaps in the catalyst stage 72 caused by catalyst settling or movement into the internal filter 28. This arrangement forms a catalyst bed with high catalyst density and excellent thermal conductivity from the wall of the finned conduit 14 through the catalyst bed.

In another embodiment which may be useful in minimizing backpressure, powder catalyst is embedded in relatively thick disks (e.g., 1 cm thick) of metal mesh and then inserted into the reformer in alternating upflow and downflow stages separated by baffles, such as shown in FIG. 1. This arrangement is particularly useful for dispersing catalyst, enabling internal filters and additional heat transfer materials to be eliminated except for a vaporizer section at the entrance to the reformer and a final filter at the exit.

Figure 8:
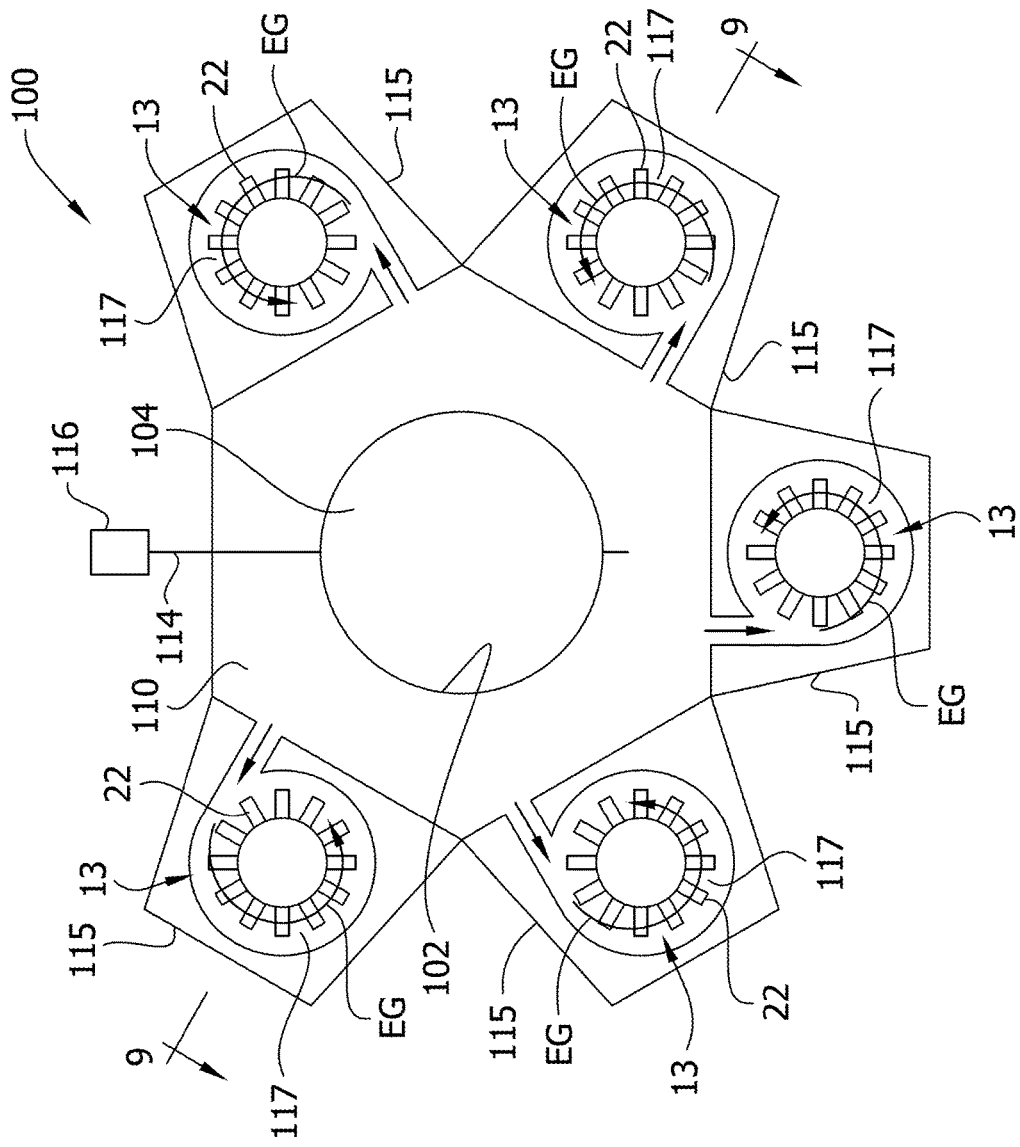
FIG. 8 is a schematic illustration of another embodiment of a reformer system.
Figure 9:
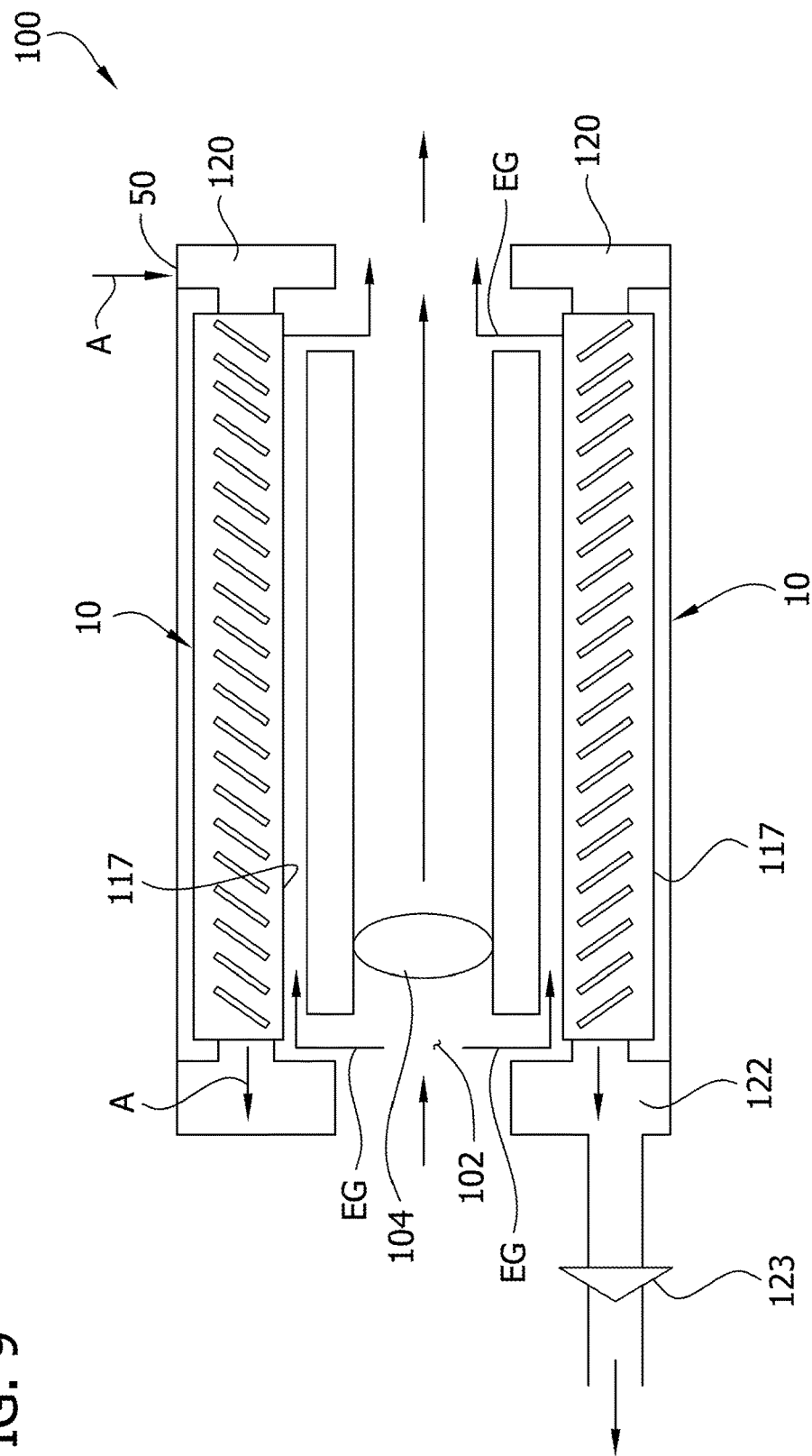
FIG. 9 is a section taken along the line 9-9 in FIG. 8.

Referring to FIGS. 8 and 9, another embodiment of a reformer system is generally indicated at 100. The reformer system 100 includes a plurality of reformers (e.g., reformer 13 from the first reformer system embodiment 10, as illustrated, or other types of reformers) clustered around a single exhaust channel 102 in order to provide increased reforming capacity in a compact package. Exhaust flow EG is controlled by a valve 104, such as a butterfly valve located toward the exit end of the exhaust channel 102. In this embodiment, it may be advantageous for the fins 22 of the reformers 10 to be arranged in a spiral fin pattern (as shown in FIG. 9) and to introduce the exhaust gas tangentially to the reformers 13 so that the exhaust flows over the fins in a spiral pattern, providing good exhaust-fin heat transfer while minimizing exhaust backpressure.

The arrangement in FIG. 8 is an array of five finned-tube (or finned-conduit) reformers 13 arranged around a hexagonal chamber 110, with the top side of the hexagon being open to accommodate the valve stem 114 and valve actuator 116. Each reformer 13 is housed within a reformer housing 115. The exhaust EG flows into the chamber 110 from above the plane of the paper as illustrated in FIG. 8 and into individual exhaust channels 117 surrounding the reformers 13 and defined by the reformer housing 115. The housing may include insulation surrounding the exhaust channels 117. FIG. 8 shows a counterflow alignment of alcohol and exhaust flow, but co-current (parallel) flow is possible. As shown in FIG. 9, alcohol may be distributed to all of the reformers 13 using an inlet manifold 120 at one end of the system 100, and reformate from the reformers may be collected using an outlet manifold 122 at the opposite end of the system. The outlet manifold 122 may include a check valve 123 for regulating flow of reformate to a heat exchanger and/or a buffer tank. The reformer system 100 allows for control of exhaust flow in order to maintain catalyst temperature and minimize exhaust backpressure. Arrangements with fewer or more finned-conduits reformers 13 are also possible. However, it has been found that such arrangements are only necessary on quite large vehicles. A reformer system with a single finned-conduit reformer 13, such as illustrated in the embodiment of FIG. 1, may provide adequate reformate for a typical four or six-cylinder engine.

Figure 10:
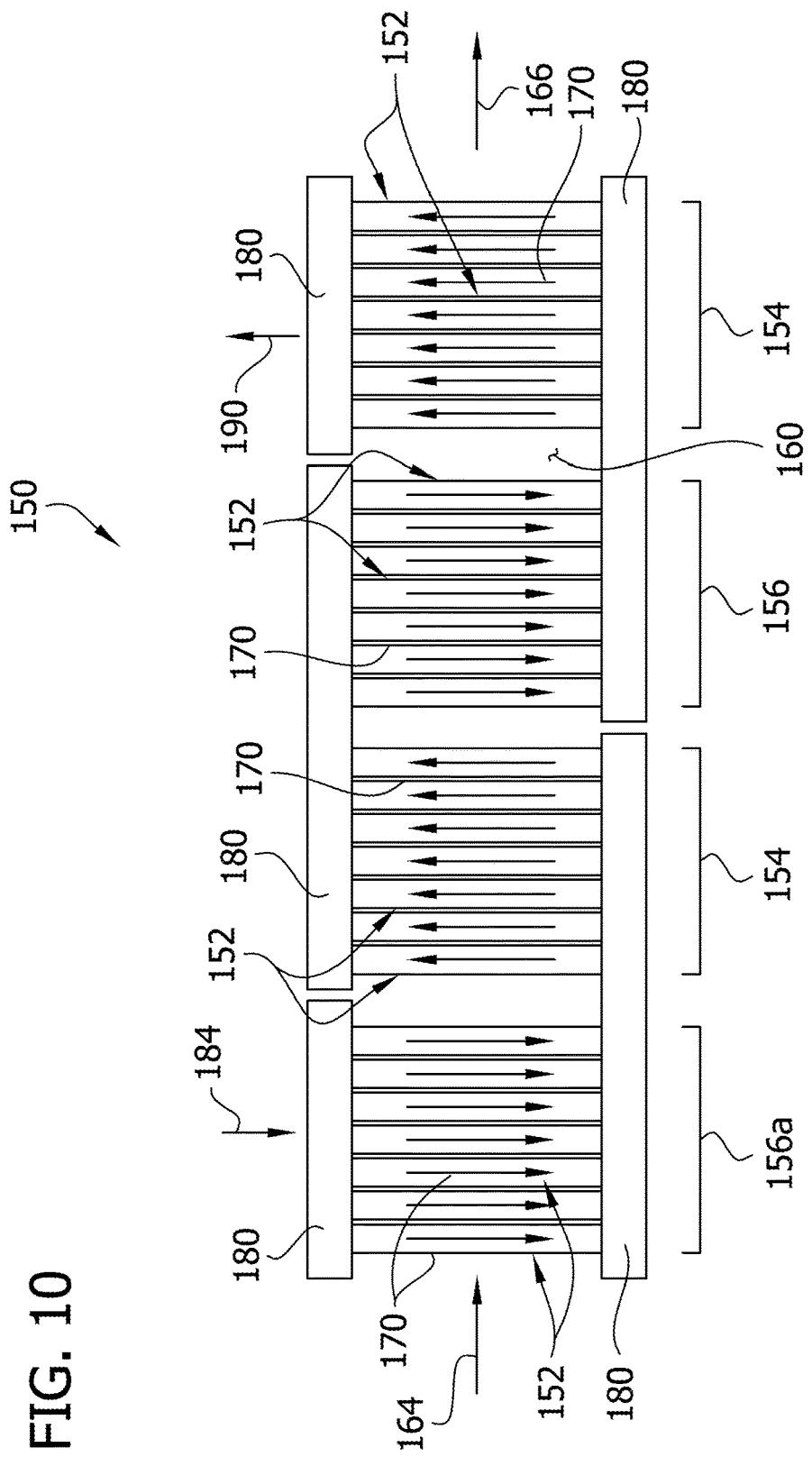
FIG. 10 is a schematic illustration of another embodiment of a reformer system.
Figure 11:
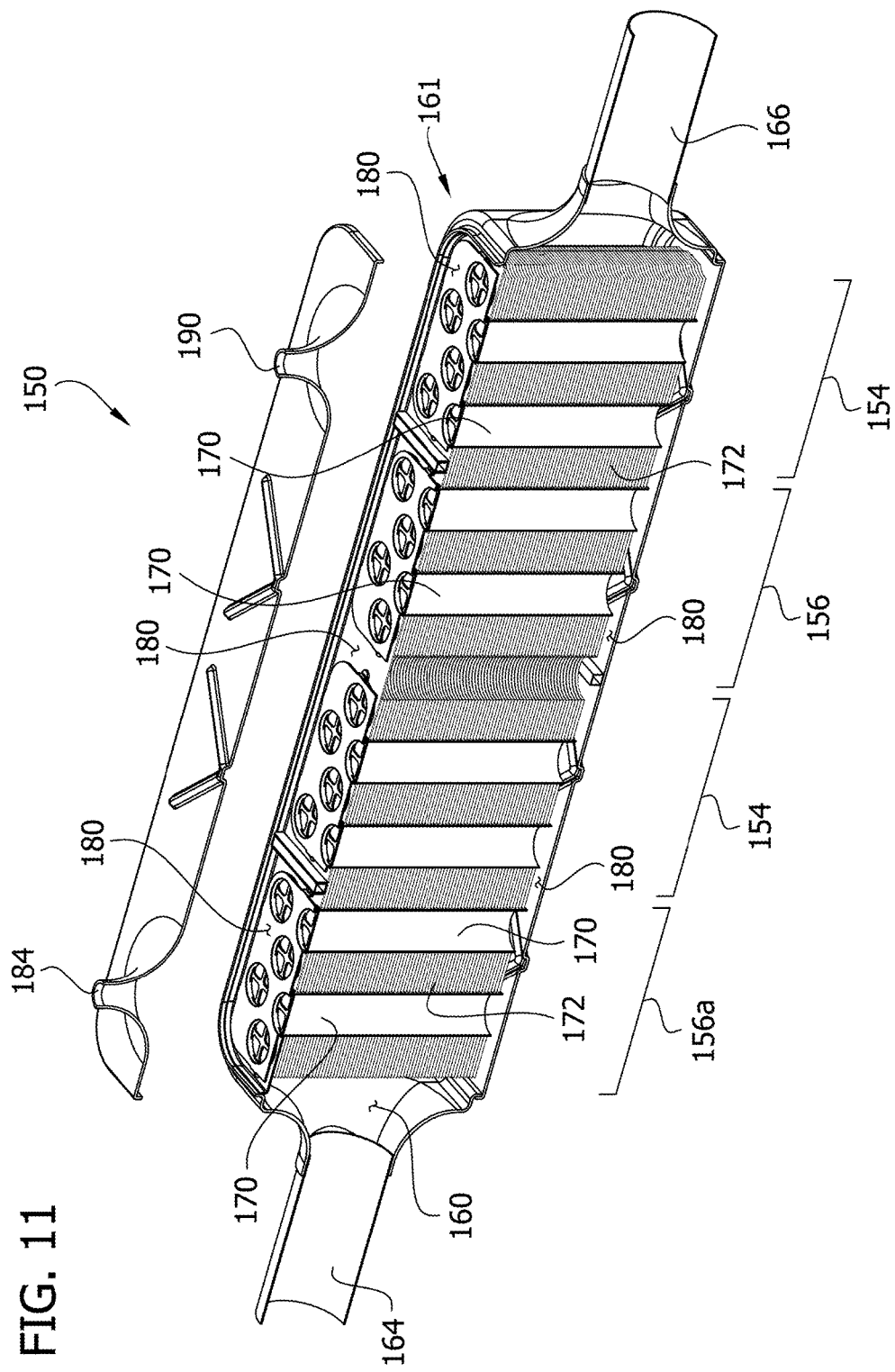
FIG. 11 is a perspective sectional view of a reformer constructed in accordance with the schematic illustration in FIG. 10.

Referring to FIGS. 10 and 11, another embodiment of a reformer system is generally indicated at reference numeral 150. In this embodiment, reformers, generally indicated at 152, are arranged in alternating upflow and downflow banks 154, 156, respectively, within an exhaust channel or passage 160 defined by a reformer housing, generally indicated at 161 (FIG. 11). In this embodiment, there are two upflow banks 154 and two downflow banks 156 of reformers 152, although there may be other configurations. As illustrated, the banks 154, 156 can be thought of as being ordered chronologically from left to right, with the first bank (on the left side) being the bank that first receives the alcohol, and the fourth bank (on the right side) being the last bank before the reformate exits the reforming system 150. As shown in FIG. 11, exhaust gas EG enters an upstream end of the housing 161 at an exhaust inlet 164, and exits a downstream end of the housing at an exhaust outlet 166. Each reformer 152 includes a conduit 170 (e.g., pipe or tube) and a plurality of fins 172 extending outward from the conduit. All of the conduits 170 may be embedded in continuous fins 172, rather than in separate fins for each bank 154, 156. It has been found that a benefit of horizontal fins 172 is that, in addition to providing heat transfer from exhaust to catalyst, the fins improve the temperature distribution in tube array reformers. Incoming fuel is generally relatively cool, while reformate exits the reformer at reaction temperature, for example from about 300 to about 350° C. The fins 172 serve to transfer heat from the downstream conduits 170, where excessive temperatures are preferably avoided, to the upstream conduits 170 where heat is required to vaporize and pre-heat the incoming fuel. The fins 172 may be less than 0.1-inch thick and fabricated from copper, for maximum thermal conductivity, but steel fins can also be used.

Figure 16:
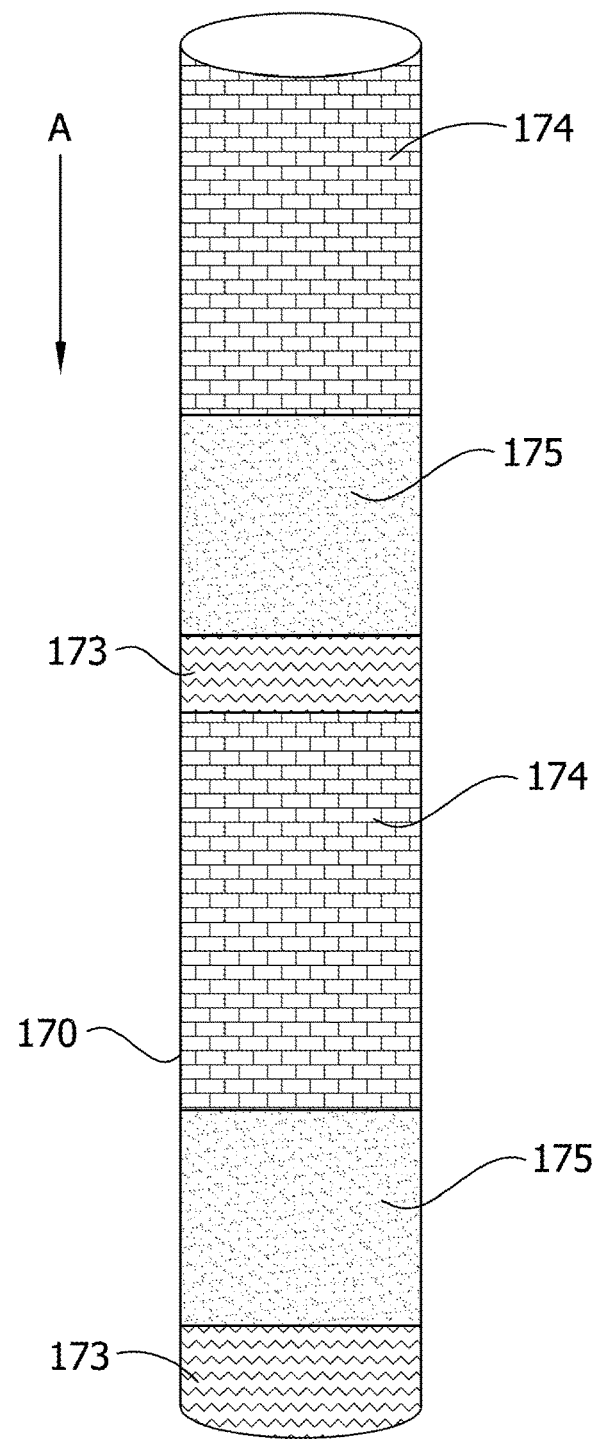
FIG. 16 is a schematic illustration of reformer stages in a reformer conduit of the reformer system in FIG. 13.
Figure 17:
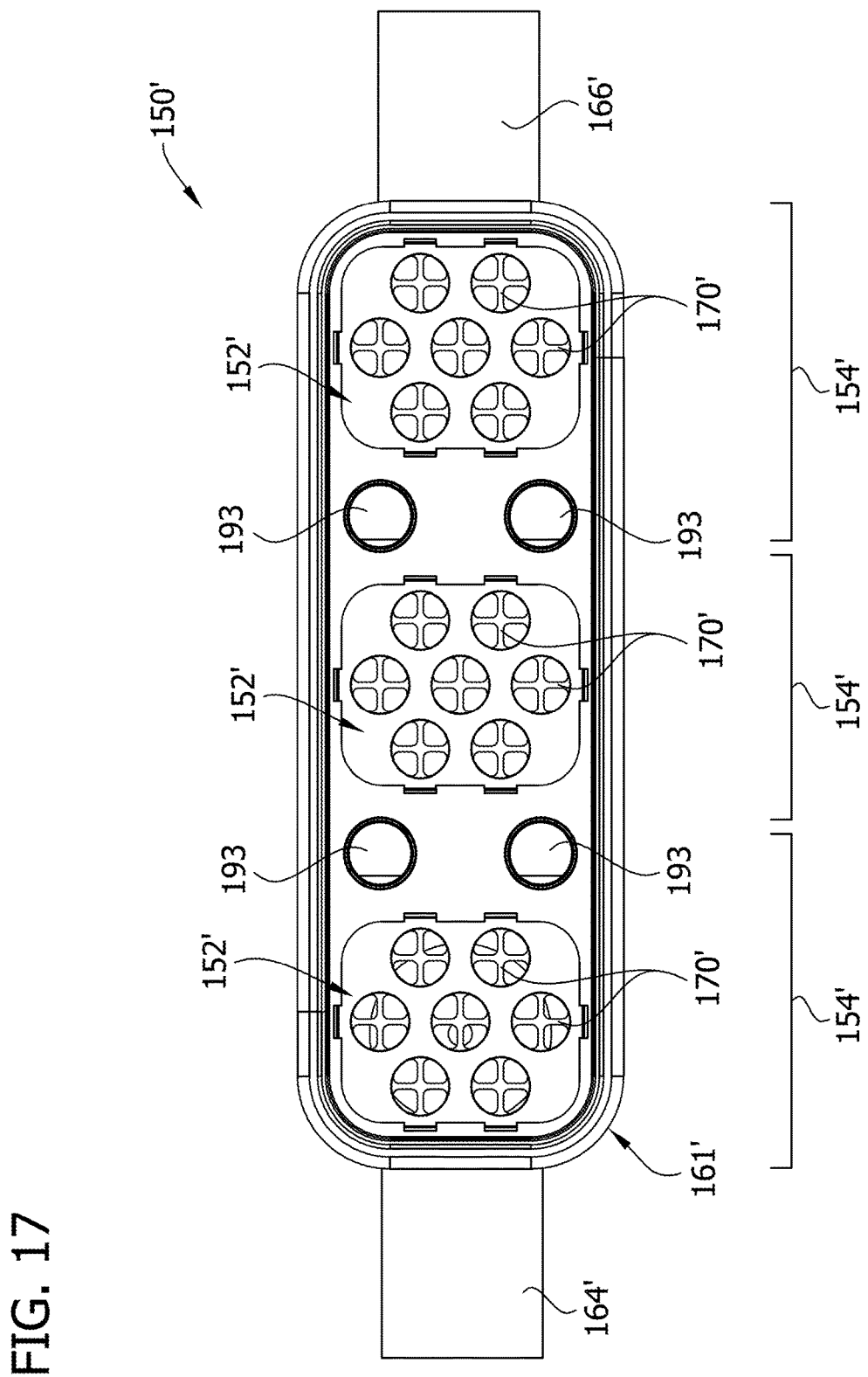
FIG. 17 is a top plan view of the reformer system in FIG. 13, with the top removed.

Referring to FIG. 16, each conduit 170 (other than the conduits in the first bank 156a of the embodiment of FIGS. 10 and 11) includes one or more catalyst stages 175 (e.g., two catalyst stages in FIG. 16) comprising powder copper-nickel catalyst embedded in a metal mesh or a shaped copper-nickel catalyst. In one embodiment, the reformers 152 may be similar to the reformer in FIG. 1, except that the reformers 152 do not include baffles. As shown in FIG. 16, filters 173 are disposed immediately downstream of the catalyst stages 175, and reheat stages 174 are disposed immediately upstream of the catalyst stages. Other arrangements and configurations are possible. The conduits 170 in the first bank 156a do not include catalyst, but include heat transfer media, such as steel wool, for vaporizing the alcohol. One particular arrangement for packing the conduits 170 when using powder catalyst is shown in FIG. 16. In this case, a 5-inch tube with a ⅞-inch internal diameter is used. The arrangement is shown for a conduit used in downflow (shown by arrow A). The order of components (from top to bottom) would be reversed for upflow. Metal foams, meshes, and wools may be materials for the reheat stages 174. If a powder catalyst is used, it may be embedded into metal wool or mesh prior to insertion into the conduit 170. This arrangement provides heat transfer in the catalyst bed 174 and simplifies loading of catalyst into the reformers 152. The powder catalyst stage 174 is an assembly consisting of a layer of powder catalyst followed in the downstream direction by a sequence of 2-5 porous metal disks of decreasing porosity. Under reforming conditions, the powder is driven by flow into this "density gradient" dispersing in the direction of flow with the finest particles embedded in the lowest porosity layer. As a result of this longitudinal dispersion of the powder catalyst, backpressure is minimized and heat transfer improved. A sequence of a powder catalyst layer 172 is followed (in the downstream direction) by a metal foam disk 173 and two or more disks of metal mesh 174, such as Bekipor with increasing porosity.

A method for packing a conduit 170 with pelleted or other structured catalyst is similar to the method for powder catalyst except that multiple catalyst stages 175 are used separated by soft metallic heat transfer media such as steel foam or wool. About one catalyst stage per inch may be preferred. This arrangement reduces chatter and attrition of the catalyst pellets by separating them with soft porous metal "pillows."

Referring to FIGS. 10 and 11, the banks 154, 156 are fluidly connected to one another through plenums 180 to allow the vaporized alcohol to flow from an upstream bank to a downstream bank. The upper plenums 180 are defined by a top portion of the housing 161 (shown exploded in FIG. 11) and upper portions of the reformer banks 154, 156, 156a. In the embodiment in FIGS. 10 and 11, alcohol enters the first bank 156a from an inlet 184 at the top of the system 150 and travels down through heat transfer media, typically steel wool, where vaporization is completed and non-volatile fuel components are knocked out. As set forth above, the remaining three banks 154, 156 include conduits (e.g., tubes) 170 containing catalyst stages 175 as well as heat transfer media. Reforming takes place in the conduits 170 of the three banks 154, 156, and the reformate mixture exits the reformer system 150 through an outlet 190 at the top of the housing 161 of the reforming system. As mentioned above, exhaust gas EG flows through the exhaust passage 160 and heat is transferred from the exhaust gas to the reformers 152 through the fins 172. Exhaust flow may be metered through the reformer system 150 using a valve, which may be located downstream of the reformer system.

The number of tubes or conduits 170 per bank 154, 156 and lengths of the conduits 170 can be varied in accordance with the fuel demand of the vehicle and packaging constraints. The number of banks 154, 156 in the reformer system 150 can also vary. Examples 7-10 describe the assembly and performance of a conduit or tube array reformer with four banks 154, 156, as shown in FIGS. 10 and 11. The conduits are preferably thin wall in order to minimize thermal mass with a diameter from 0.5 to 2 inches, more preferably 0.75 to 1.5 inches in diameter. The conduits 170 may be formed from stainless steel, so as to withstand the corrosive compounds and high temperatures of automotive exhaust.

In a particular embodiment, each of top and bottom components of the housing 161 are integrally formed as a single one-piece structure, such as shown in FIG. 11, in order to improve the mechanical strength of the reformer. Laser welding may be used to achieve leak-free seals between plenums 180, although other techniques may be used. In order to reduce reformer heatup time, the side walls of the reformer system 150, more particularly, the side walls of the housing 161, may be insulated. A thin layer of rigid, ceramic-based insulation such as "K-wool" is effective for this purpose. In addition, the entire reformer 150 is preferably insulated to minimize heat losses to the environment.

Figure 12:
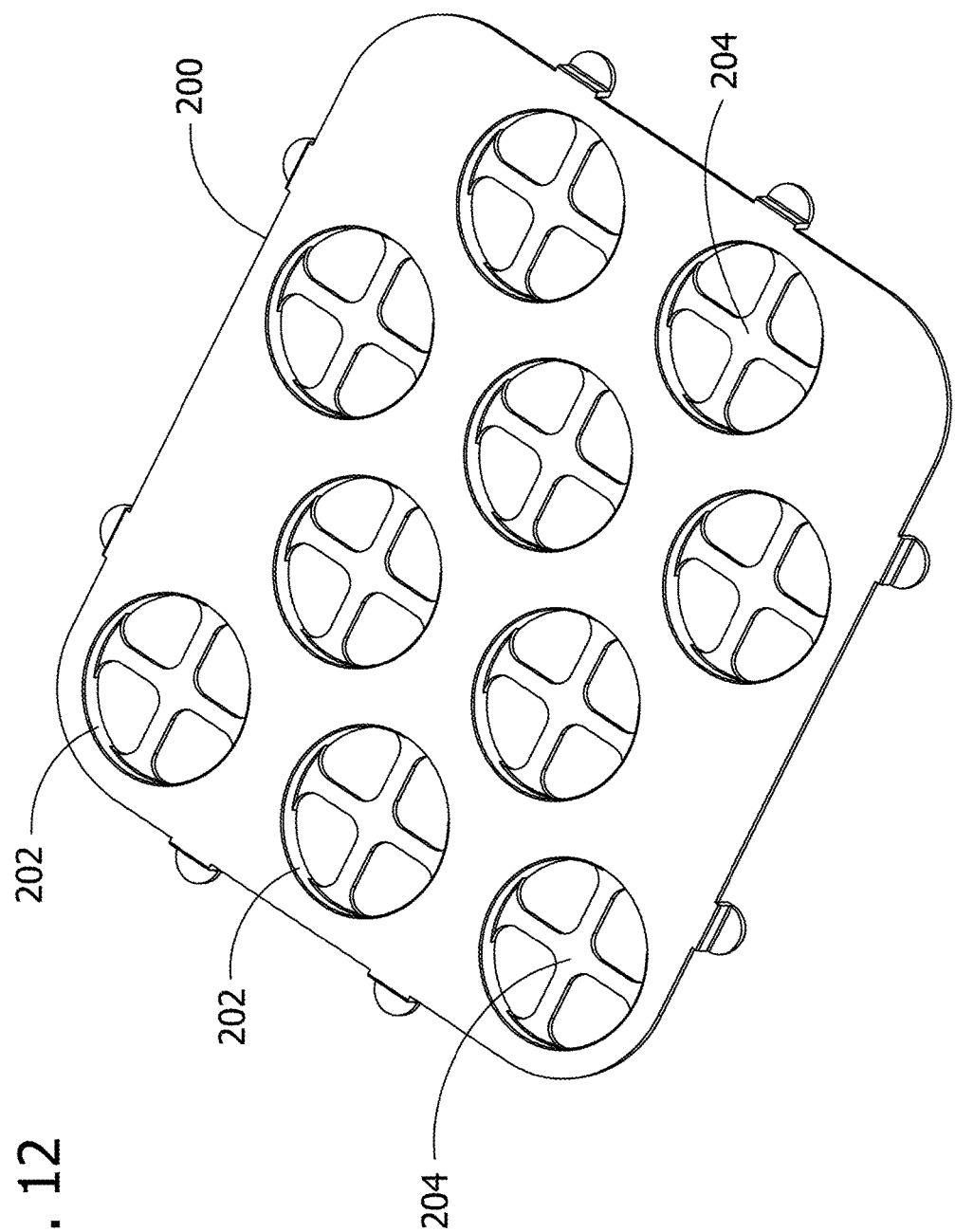
FIG. 12 is a top perspective of a stop plate for each bank of the reformer in FIG. 11.
Figure 12A:
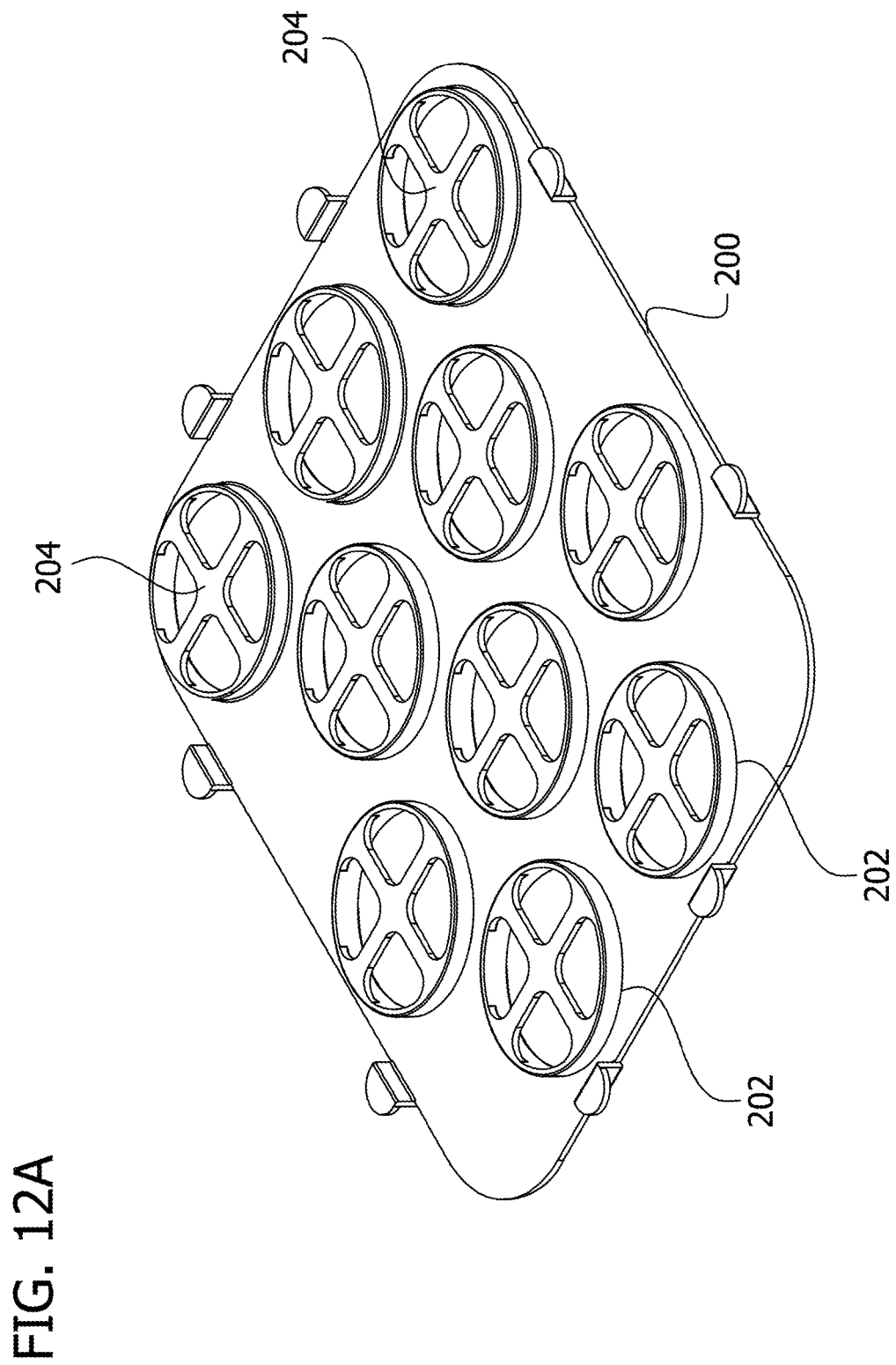
FIG. 12A is a bottom perspective of the stop plate.
Figure 13:
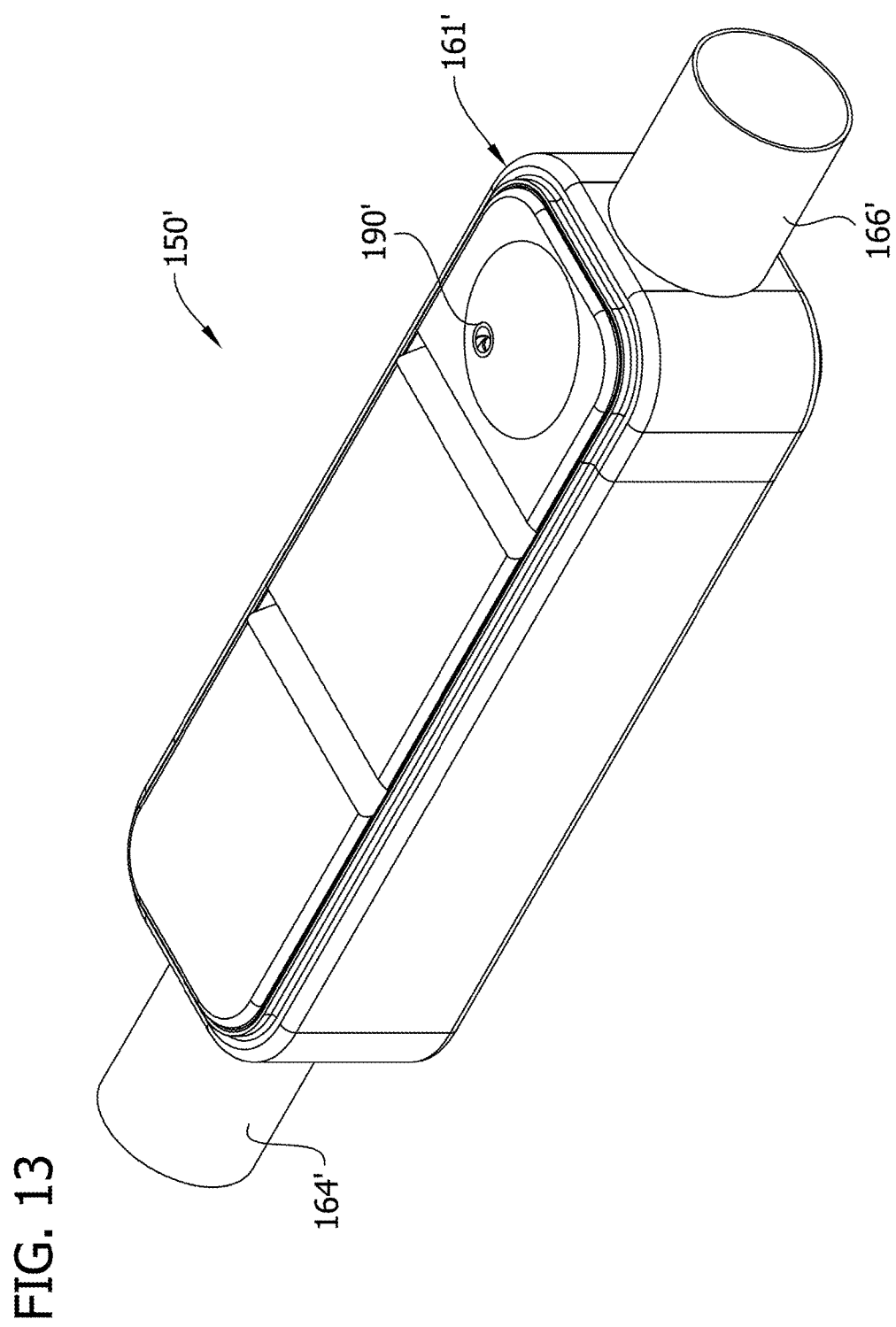
FIG. 13 is a top perspective of another reformer system.
Figure 14:
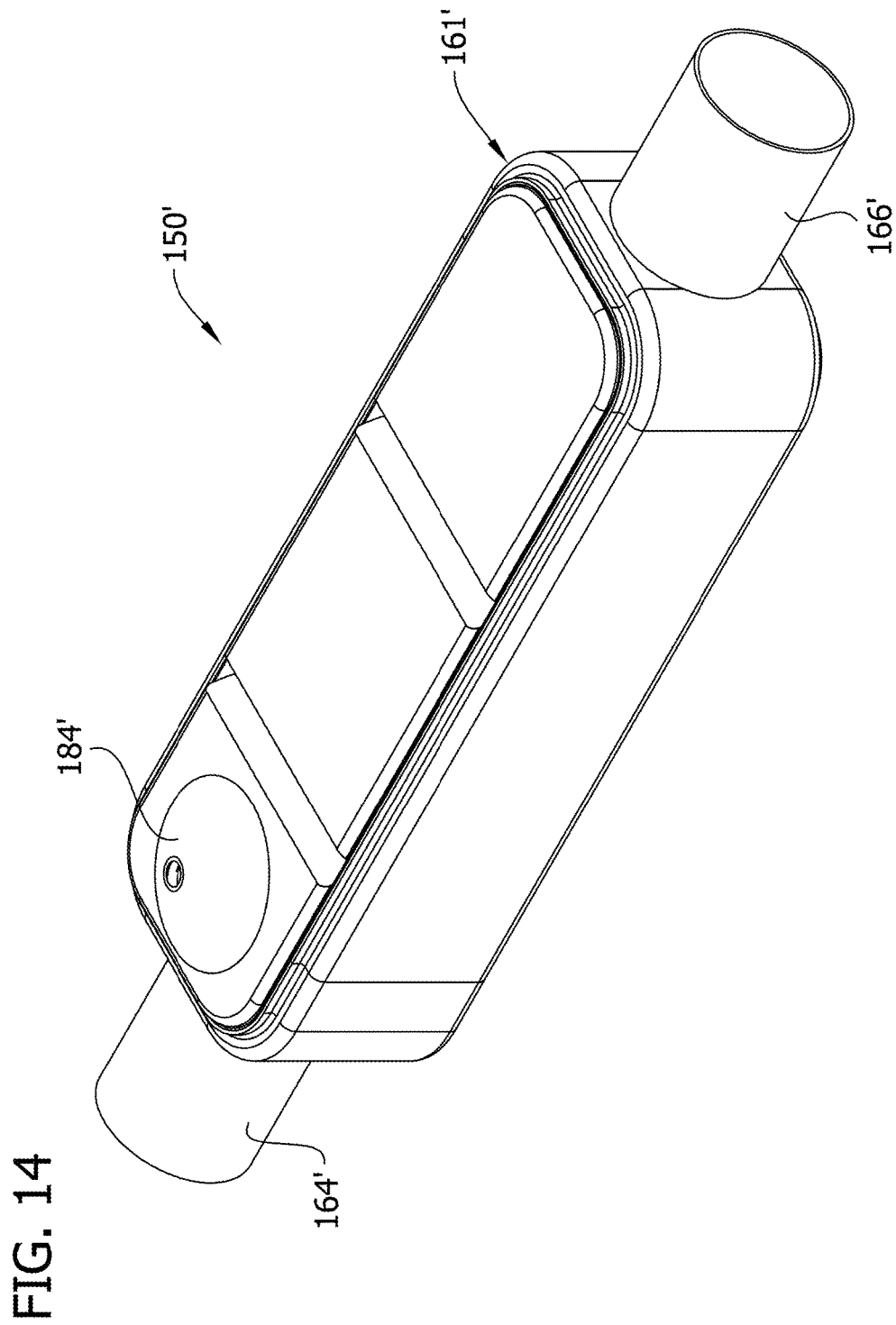
FIG. 14 is a bottom perspective of the reformer system in FIG. 13.

The reformer conduits 170 of the present disclosure may be packed from the top using a ramrod to firmly seat the internals. As shown in FIGS. 11 and 12, stops 200, in the form of plates defining plurality of openings 202 that align with the conduits 170 may be affixed to the bottom of the conduit. The stop includes crosses 204 or other structure in the openings 202 to support the internals as they are driven into the conduit 170 with the ramrod. Moreover, in one example the reformer system 150 may be assembled by inserting the conduit 170 into spaces between the fins 172 and then expanding the conduits by ramming ball bearings down the conduits. The assembly can then be brazed. The stops 200 can be welded to the bottom of the conduits 170, and after stuffing the conduits, additional stops 200 can be attached to the top of the conduits 170.

Minimizing backpressure in the alcohol reformer system, such as system 150, may be beneficial because it enables the reformer system to be constructed using thinner metal in the conduits 170 and housing 161, thereby reducing cost and thermal mass. It has been found that catalyst pellets comprising copper as the primary active metal and minimal nickel on a support is stable to alcoholysis and hydrolysis under reforming conditions. Activated carbon is a suitable support. In one embodiment, the copper-carbon pellet stages alternate with powder catalyst stages in the gradient packing arrangement described above.

An exemplary type of catalyst is copper deposited onto platinum or palladium on carbon pellet catalysts. The loading of platinum or palladium may be 0.5-3% by weight. Because these catalysts do not contain significant quantities of nickel, dehydrogenation of ethanol (equation 4) occurs rather than the reaction of equation 2.

$$CH_3CH_2OH \rightarrow CH_3CHO + H_2 \qquad (4)$$

An exemplary way of preparing the catalysts is by electroless plating of Pd/C or Pt/C pellets. This way of catalyst preparation is described for powder supports in U.S. Pat. Nos. 5,916,840, 5,689,000 and 5,627,125 "Process for Preparing Carboxylic Acid Salts and Catalysts Useful in Such Process," the relevant teachings of the preparation being incorporated herein by reference. A suitable procedure for pellets is illustrated in Example 6.

In one embodiment, one or more reformers, such as reformers 13, 70, 152, of a reforming system, such as reformer system 10, 100, 150, for reforming methanol to a mixture of gases including hydrogen may include the above-disclosed copper-plated Pd/C or Pt/C pellets, and the copper-plated nickel sponge catalyst may be omitted from the reformer. In this embodiment, using only the Pd/C or Pt/C pellets, and omitting the copper-plated nickel sponge, improves the back pressure of the system.

Referring to FIGS. 13-15 and 17, backpressure and thermal mass may be further reduced by using the reformer system 150'. This embodiment is similar to the embodiment 150 illustrated in FIGS. 10-12, with like components indicated by corresponding reference numerals plus a prime symbol. Unless otherwise indicated, the disclosure set forth above with respect to the reformer system 150 applies equally to the present reformer system 150'. In general, the reformer system 150' includes a housing 161' defining an exhaust channel 160', an exhaust inlet 164', and exhaust outlet 166'. Within the exhaust channel 160' are three banks 154' of seven reformers 13', although the reformer system 150' may include more or less banks, each with more or less reformers 13' than illustrated. Each of the banks 154' are upflow banks, in that the alcohol vapor flows upward through the conduits 170' in each of the banks. In particular, in the illustrated embodiment, the alcohol vapor enters the first bank 154' through the inlet 184' and flows upward through the corresponding conduits 170' and into the upper plenum 180' associated with the first bank. As can be understood from FIGS. 15 and 17, from the first upper plenum 180', the alcohol flows downward through shunt conduits or tubes 193 (FIG. 17) and into a second lower plenum associated with the second catalyst stage 154' (i.e., intermediate catalyst stage). The alcohol vapor then flows upward through the corresponding conduits 170' of the second catalyst stage 154' and into the corresponding second upper plenum 180' associated with the second catalyst stage. From the second upper plenum 180', the alcohol flows downward through shunt tubes 193 and into the third lower plenum associated with the third catalyst stage 154' (i.e., the last catalyst stage). The alcohol vapor then flows upward through the corresponding conduits 170' of the third catalyst stage 154' and into the corresponding third upper plenum 180' and exits the housing 161' through the outlet 190'.

Figure 15:
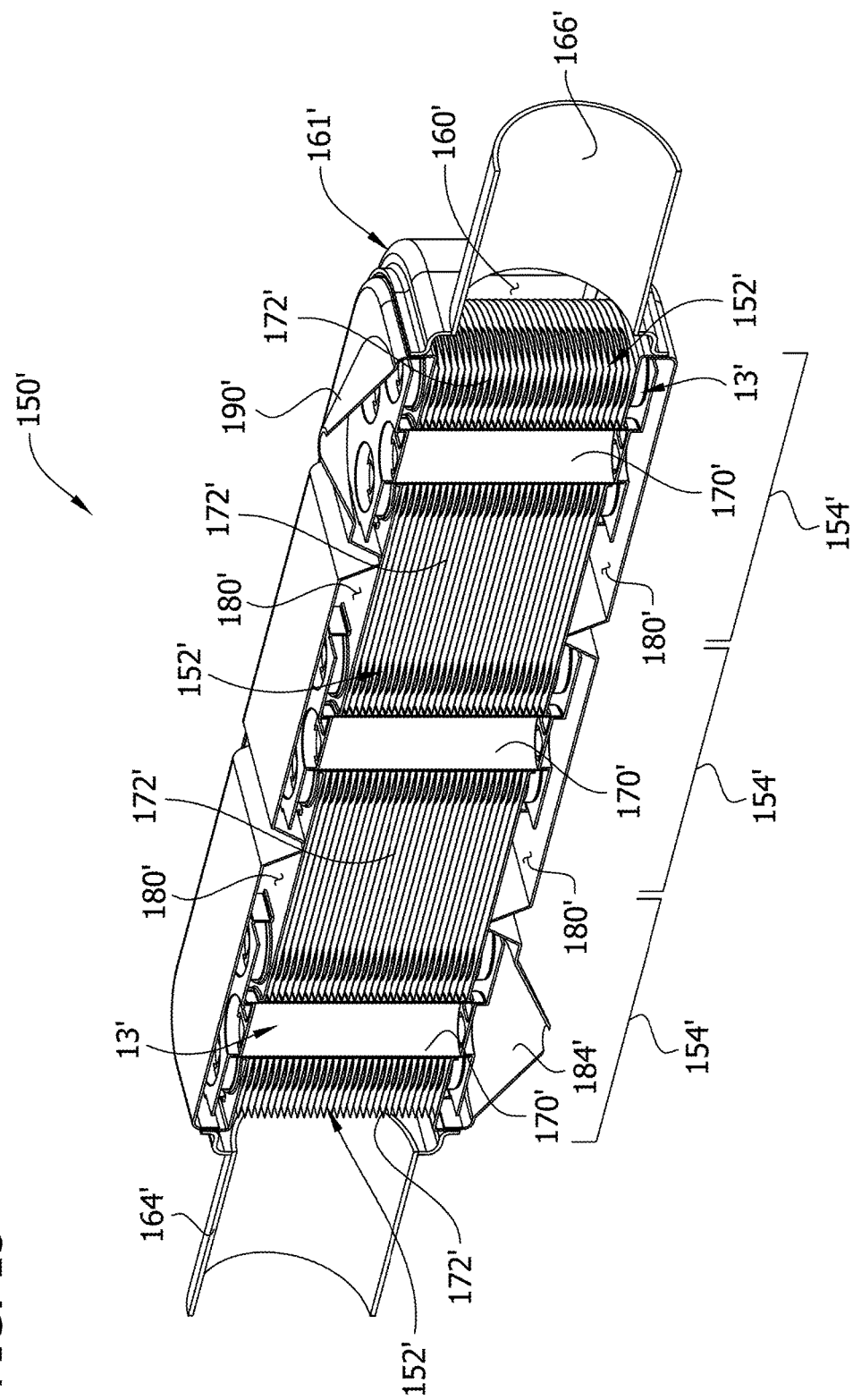
FIG. 15 is a perspective sectional view of the reformer system in FIG. 13.

A reformer system constructed according to the teachings of the reformer system 150' has been found to provide adequate reforming capacity for a V6 engine without noticeable pressure drop across the reformer on either the fuel or exhaust side. In one example, the conduits 170' of this reduced-mass reformer may be only three inches long, compared with the 40-conduit reformer described above with respect to FIG. 11, which comprised five-inch conduits. An effective packing of this design is described in Example 11. The exhaust inlet and outlets 164', 166' may have 2.5-inch diameters, and a 2.5 inch high exhaust channel 160' (FIG. 15). The reformer conduits 170' may have a ¼-inch protrusion into the plenums 180' on the top and bottom of the reformer housing 161' for welding purposes. As in the four-bank design, insulating panels are inserted on either side of the exhaust channel 160'.

In another embodiment, the exhaust flow can be modified in order to achieve faster heatup times while improving engine efficiency, particularly in V6 and V8 engines. The product gas (reformate) produced by reformer systems of the present disclosure when operating with ethanol-containing fuels or methanol-containing fuels enables the engine to run with high dilution. When dilution takes the form of high levels of exhaust gas recirculation (EGR), improved efficiency and ultra-low $NO_x$ emissions can be achieved. Often, exhaust gas recirculation is achieved by "internal EGR." This EGR mode, which is well-known in the art, involves leaving the exhaust valve open during a portion of the intake stroke, thus drawing exhaust from the exhaust manifold back into the engine. High levels of internal EGR lengthen the period during which the exhaust valve is open.

Aggressive internal EGR can lead to excessive exhaust in some cylinders, typically cylinders 3 and 6 in the case of a V6 engine due to dynamic pressure waves within the exhaust manifold which cause extra EGR in the last cylinder before exiting the manifold. In some exhaust-manifold designs, the exhaust-pulse from the front cylinder of each bank travels along the manifold and caused increased pressure immediately adjacent to the last cylinder just before its exhaust-valve closes.

Figure 22:
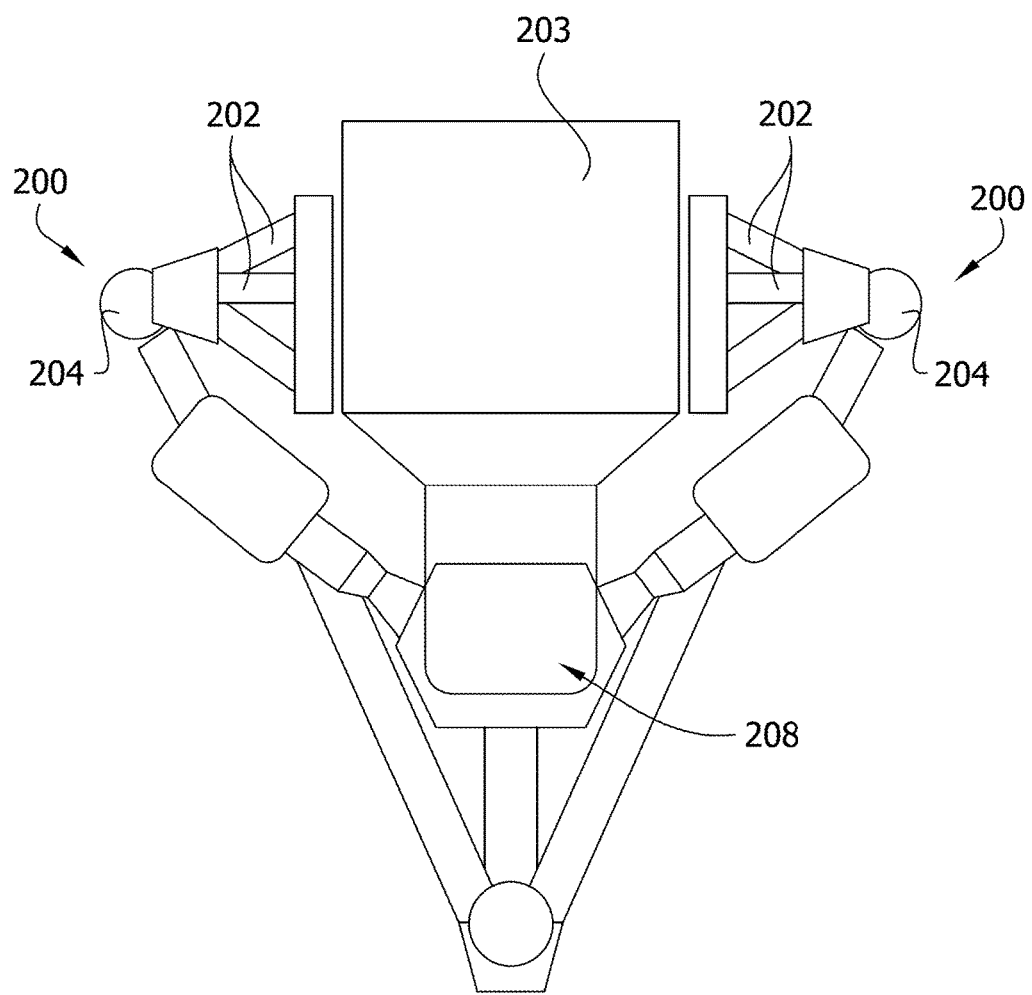
FIG. 22 shows an internal combustion engine, transmission and exhaust system including exhaust headers with a reformer positioned above the transmission and close-coupled to the engine to reduce heatup time and fed with exhaust flow from both sides.

Referring to FIG. 22, the above-described condition can be remedied by use of exhaust manifolds, each indicated generally at 200, with equal-length runners (e.g., pipes) 202 leading from an exhaust of each cylinder of an engine 203 to a collector 204. This type of manifold 200 may be referred to as an "exhaust-header." Use of exhaust headers 200 enables a modified vertical conduit array reformer system, generally indicated at 208, to be close-coupled to the engine 203, reducing heatup time. This configuration, shown in FIG. 22, depends on converging exhaust flow from the two manifolds 200 entering the reformer system 208 from opposite sides. In this configuration, the exhaust headers 200 are preferably angled slightly upward so as to enable the reformer system 208 to be positioned above the transmission 210, as shown in FIG. 22.

Figure 23:
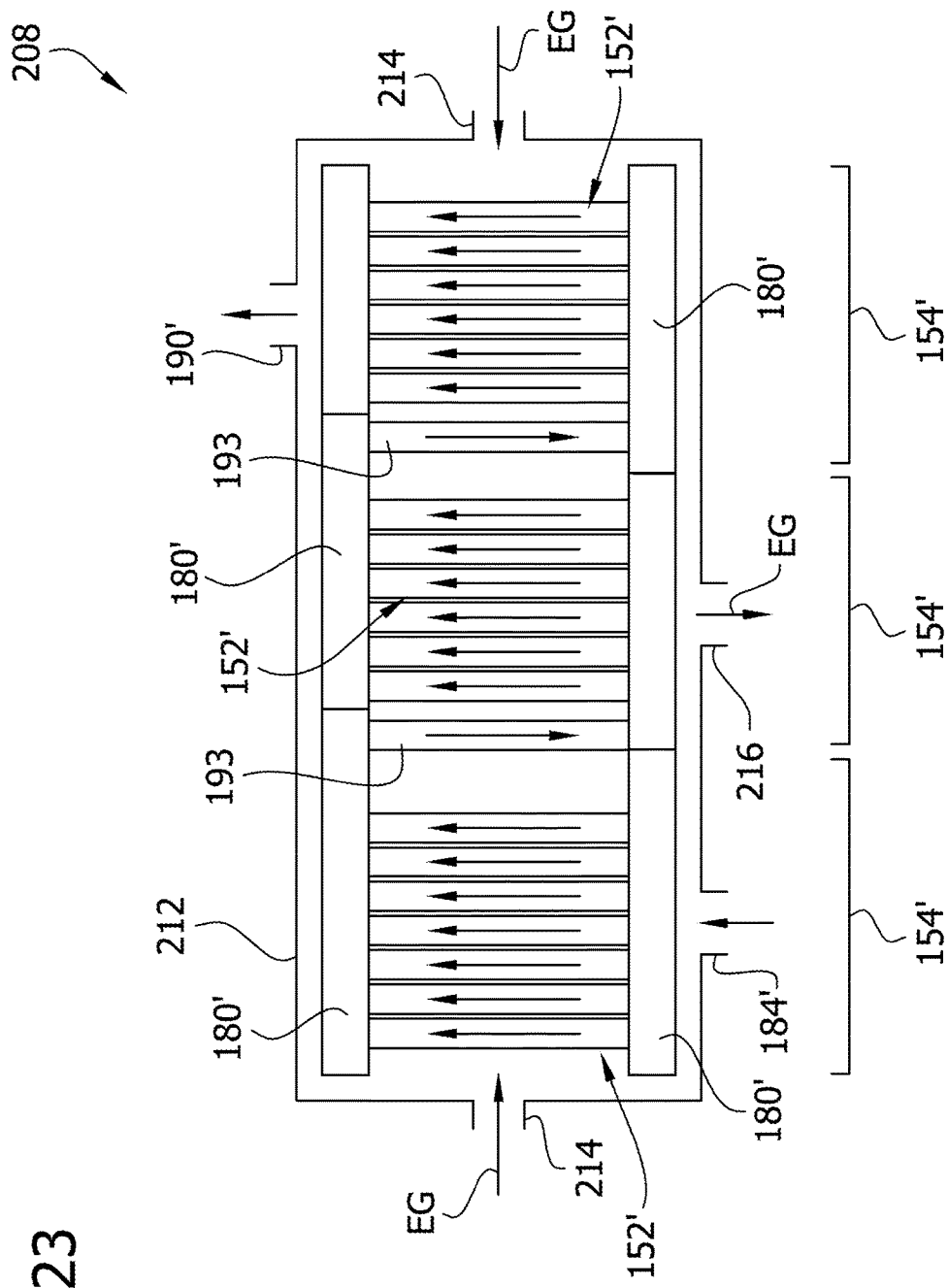
FIG. 23 is a schematic illustration of a reformer system suitable for use in the system of FIG. 22.

A suitable configuration for the reformer system 208 in the configuration of FIG. 22 is shown in FIG. 23. This reformer system 208 is substantially similar to the reformer system 150', with like components indicated by the same reference numerals. The main difference between the present system 208 and the system 150' is that the present system has a housing 212 with a different configuration to allow for a different path for the exhaust gas flow EG. In the present system 208, exhaust gas enters inlets 214, 214 at both ends of the housing 212 and exits an outlet 216 generally at the center of the housing. The exhaust gas EG may exit the outlet 216 in either a horizontal direction or downward direction (as shown in FIG. 23). This system 208 does not include the co-current orientation of exhaust gas flow EG and ethanol/reformer flow. The reformer system 208 in FIG. 23 includes three reformer banks 154' which are identical to the banks of the system 150', but a shorter two-bank reformer system (or a three-bank reformer system with fewer rows of conduits 152' per bank) may be constructed where geometric constraints imposed by the size of the engine or available space in the engine compartment favor a shorter design. The reformer system 208 can be made wider or deeper (transverse to the direction of exhaust flow EG) if it is preferable to maintain a larger fin area and/or conduit volume.

Having described the invention in detail, it will be apparent that modifications and variations are possible without departing from the scope of the invention defined in the appended claims.

EXAMPLES

The following non-limiting examples are provided to further illustrate the present invention. In the Examples, the reformer conduits referred to in the above description are configured and referred to below as "tubes."

Example 1

This Example describes the preparation of copper-plated nickel sponge. The product is a wet catalyst slurry which can be applied directly to fibrous metal supports such as G-Mat.

796 g of Raney Nickel 2800 (WR Grace, purchased through Spectrum) was weighed out under water by Archimedes' method in a 4-liter beaker assuming a density factor of 1.16. The supernatant was decanted. 619 g of $CuSO_4.5H_2O$ (JT Baker and EMD, 20% copper with respect to substrate) was dissolved in 2508 g of Versene 100 (Dow via Spectrum), 1.05 equivalents of $Na_4EDTA$ with respect to copper) and added to the catalyst. The slurry was stirred with an overhead stirrer and 1.0 equivalents of 50% NaOH (198 g) was added dropwise over 31 minutes. The pH rose from 8.5 to 12.0. The final temperature was 50° C.

The dark blue supernatant was decanted and the beaker wrapped with heating tape. 973 g of hot 50% gluconic acid (Alfa Aesar) was added along with 0.5 liters of water. Heating and stirring were initiated. A solution of 309 g of $CuSO_4.5H_2O$ (EMD, 10% copper with respect to substrate) in 1.2 liters of water was added dropwise over 201 minutes with five minutes of additional stirring. The pH fell from 4.2 to 2.1 and the temperature rose from 56° C. to 69° C.

The brown catalyst was rinsed twice with three liters of deionized water. The dull brown catalyst was stored under water.

Example 2

This Example describes preparation of copper-plated nickel sponge by the method of Example 1 followed by drying and passivation with air.

788 g of Raney Nickel 2800 (WR Grace, purchased through Spectrum) was weighed out under water by Archimedes' method in a 4-liter beaker assuming a density factor of 1.16. The supernatant was decanted. 626 g of $CuSO_4.5H_2O$ (JT Baker and EMD, 20% copper with respect to substrate) was dissolved in 2480 g of Versene 100 (Dow via Spectrum), 1.05 equivalents of $Na_4EDTA$ with respect to copper) and added to the catalyst. The slurry was stirred with an overhead stirrer and 1.0 equivalents of 50% NaOH (201 g) was added dropwise over 32 minutes. The pH rose from 8.4 to 12.5. The final temperature was 57° C.

The dark blue supernatant was decanted and the beaker wrapped with heating tape. 983 g of hot 50% gluconic acid (Alfa Aesar) was added along with 0.5 liters of water. Heating and stirring were initiated. A solution of 313 g of $CuSO_4.5H_2O$ (EMD, 10% copper with respect to substrate) in 1.2 liters of water was added dropwise over 160 minutes with five minutes of additional stirring. The pH fell from 3.9 to 2.0 and the temperature rose from 53° C. to 77° C.

The brown catalyst was rinsed twice with three liters of deionized water. The catalyst was dried overnight under vacuum at 120° C. with nitrogen purge. The dry catalyst (851 g) was allowed to cool in the oven under nitrogen, and then poured out in portions into a lasagna pan in the sink, with running water keeping the outside of the pan cool and continuous stirring of the powder with a spatula. A little water (a few ml each time) was added every few minutes to control the temperature and mixed thoroughly with the catalyst by stirring. Some sparking was seen initially. The process took ten minutes. The pan then sat out for another hour to complete oxidation before re-drying the catalyst under the same conditions. 912 g of passivated dry catalyst was recovered.

Example 3

This Example describes a simple reformer built to determine the heat transfer properties of powder beds of copper-plated nickel sponge. A large reformer was fabricated out of Monel with a cylindrical catalyst chamber, two inches in diameter. Surrounding the catalyst chamber through which hot nitrogen passed as a simulant of automotive exhaust.

The bottom of the reactor was packed with glass wool supported on a metal screen with holes in it. Nine $\frac{1}{16}$" thermocouples were fed through the bottom to different depths and in several radial positions. The depth of the chamber from the flange to the glass wool was five inches with no catalyst in the reformer.

267.0 g of dry passivated copper-plated nickel sponge prepared according to the procedure of Example 2 was poured into the reformer forming an even cylindrical bed. No packing (such as G-Mat) was used. The bed depth was 2.25 inches. More glass wool was added above the bed in order to prevent a focused stream of ethanol from excavating a divot in the top of the catalyst bed.

Absolute ethanol was fed from the top after preheating in an evaporator and using a heat exchanger which exchanges heat between nitrogen exiting the reformer and incoming steam or ethanol. Reformate composition was monitored using a Micro-GC from Agilent.

Very little variation in catalyst temperature with depth was seen. Catalyst temperature is reported as a function of radius, representing an average of a group of thermocouples near the catalyst chamber wall, on the midline and a group at intermediate positions.

Example 4

This Example demonstrates the substantial temperature gradients that develop in beds of copper-plated Raney nickel and the use of a fibrous metal medium to largely eliminate the gradient. The reactor system and catalyst bed of Example 3 was operated using a 5 ml/min feed rate of ethanol. The ethanol and nitrogen flowrates and nitrogen temperatures are given in Table 1.

After performing the experiment, the catalyst was removed from the reformer and then re-loaded mixed with 28 2-inch disks formed from copper gauze. (Copper Knitted Wire Industrial Cleaning Mesh). 28 of the disks weighing a total of 17.92 g were placed in the reformer along with the catalyst. The stack of disks extended to near the top of the catalyst bed, but did not quite reach the upper surface of it. When the catalyst was removed from the reactor it was gray in color and not pyrophoric or self-heating.

As originally prepared, the catalyst bed had cracks which disappeared over several hours of operation with occasional tapping on the reformer wall. The experiment in Table 1 was then repeated. Temperature profiles with and without copper gauze are shown in FIGS. 18 and 19.

TABLE 1

| Protocol for Example 4 | | | |
| --- | --- | --- | --- |
| Experiment time (min) | Ethanol flowrate (ml/min) | $N_2$ temperature | $N_2$ flowrate (slpm) |
| 0-70 | 0 | 520° C. | 200 |
| 70-160 | 5 | 520° C. | 200 |
| 160-250 | 5 | 540° C. | 200 |
| 250-340 | 5 | 560° C. | 200 |
| 340-430 | 5 | 580° C. | 200 |
| 430-460 | 0 | No heat | 200 |

Figure 18:
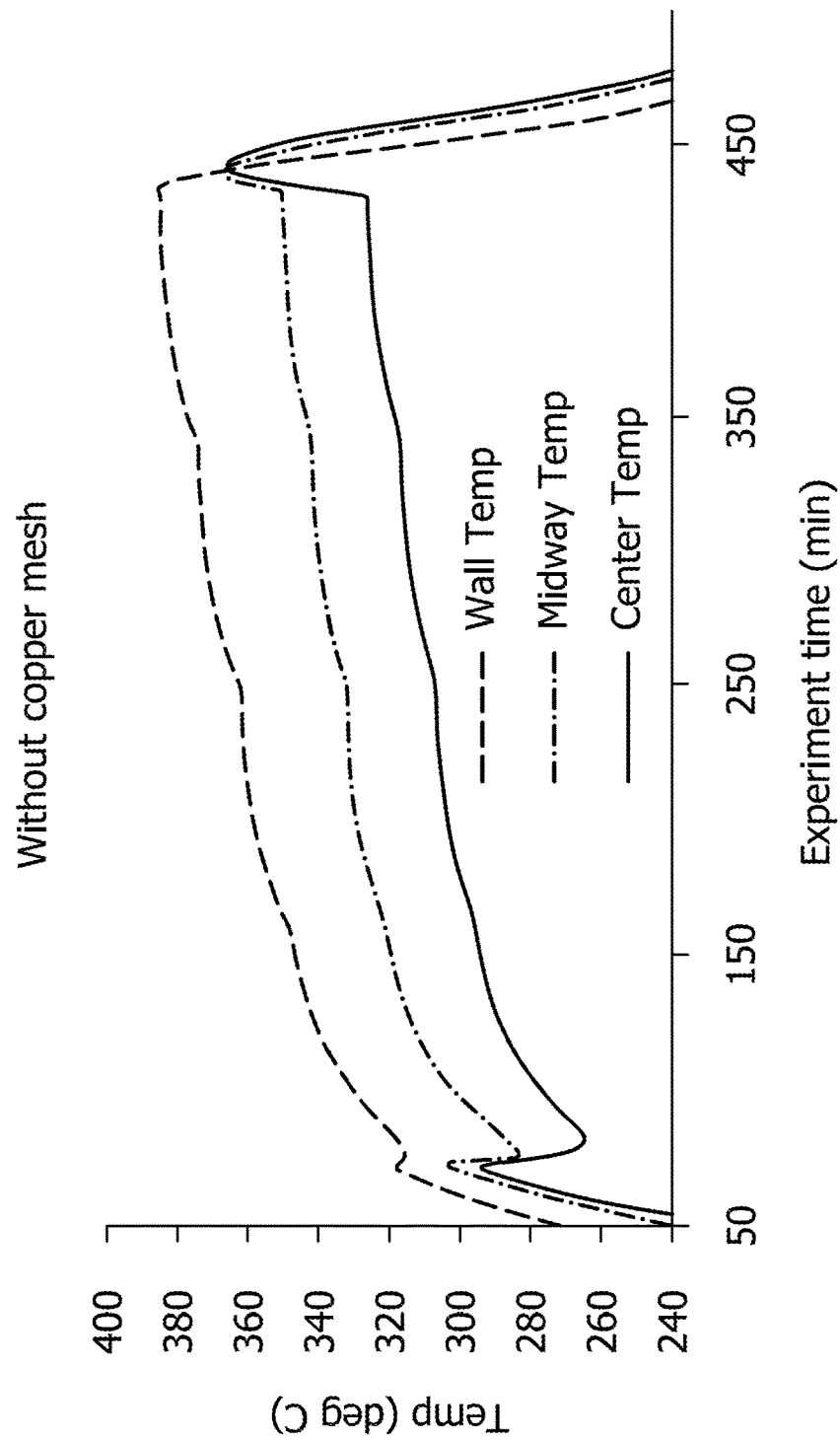
FIG. 18 is a graph illustrating a temperature profile when reforming 5 ml/min of ethanol in a catalyst bed without copper gauze disks integrated into the catalyst bed, according to the teachings of Example 4.
Figure 19:
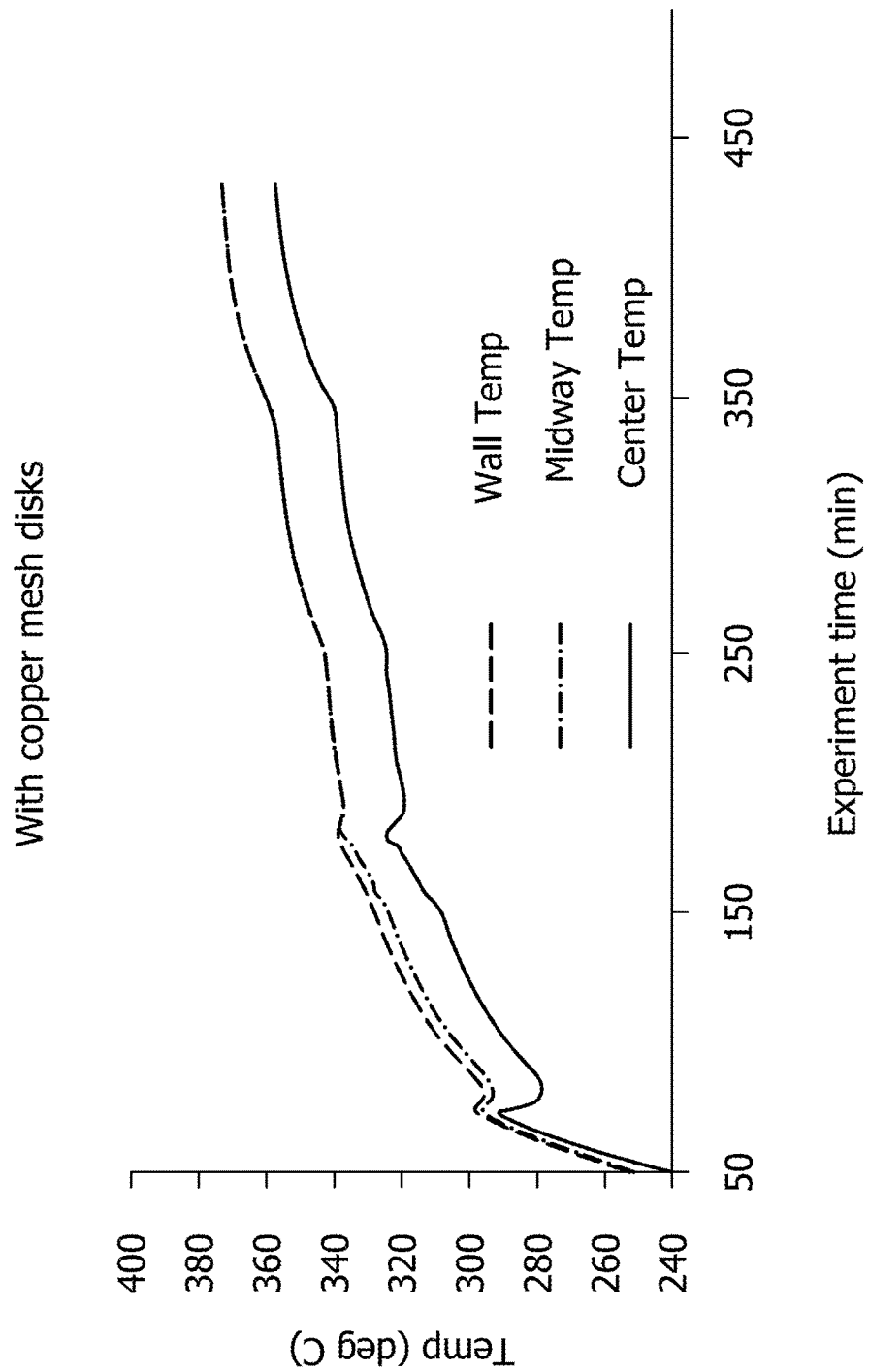
FIG. 19 is a graph illustrating temperature profile when reforming 5 ml/min of ethanol in a catalyst bed with copper gauze disks integrated into the catalyst bed, according to the teachings of Example 4.

As seen in FIGS. 18 and 19, the copper gauze greatly reduced the temperature gradient across the radius of the reactor particularly between the wall and intermediate thermocouples.

Example 5

Figure 20:
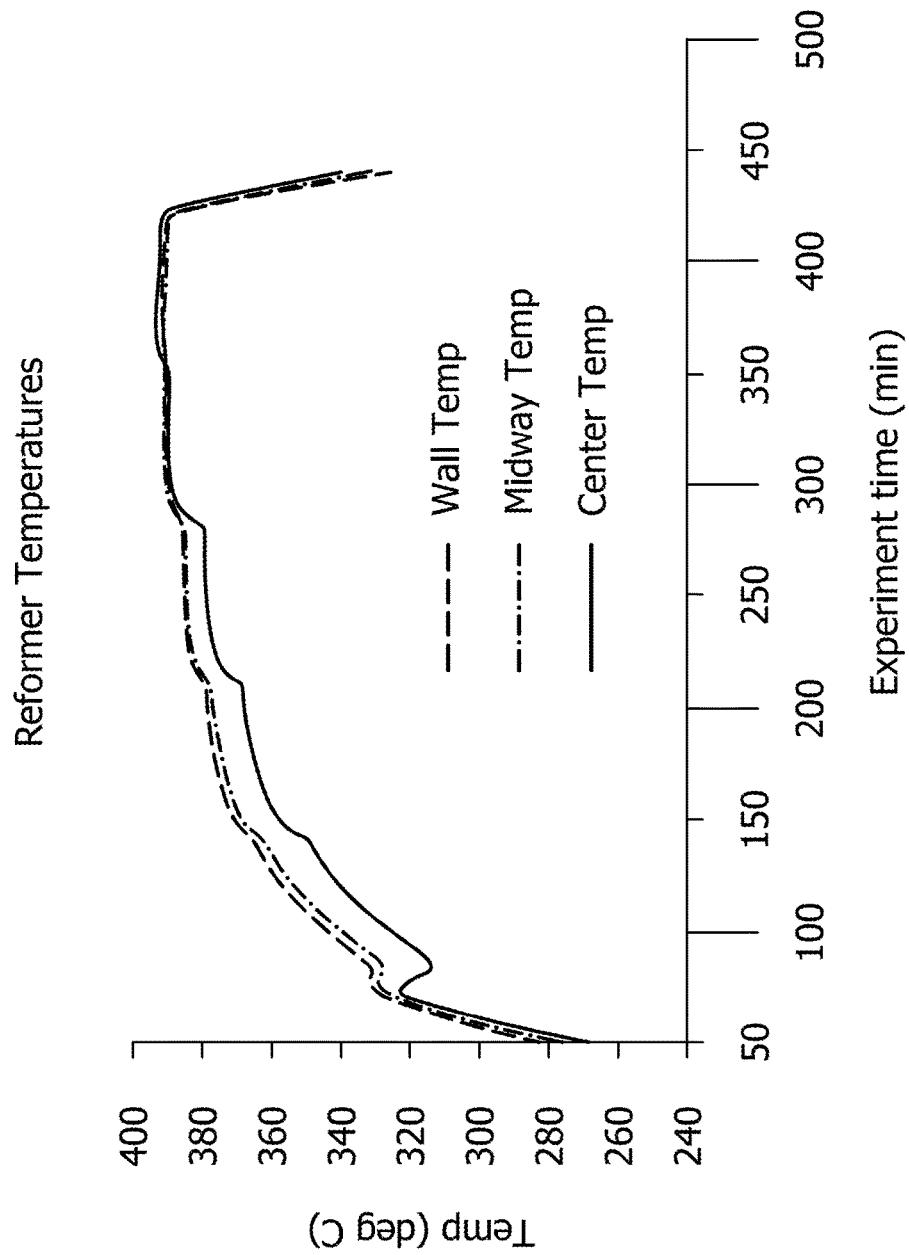
FIG. 20 is a graph illustrating reformer temperatures for the experiment of Example 5.
Figure 21:
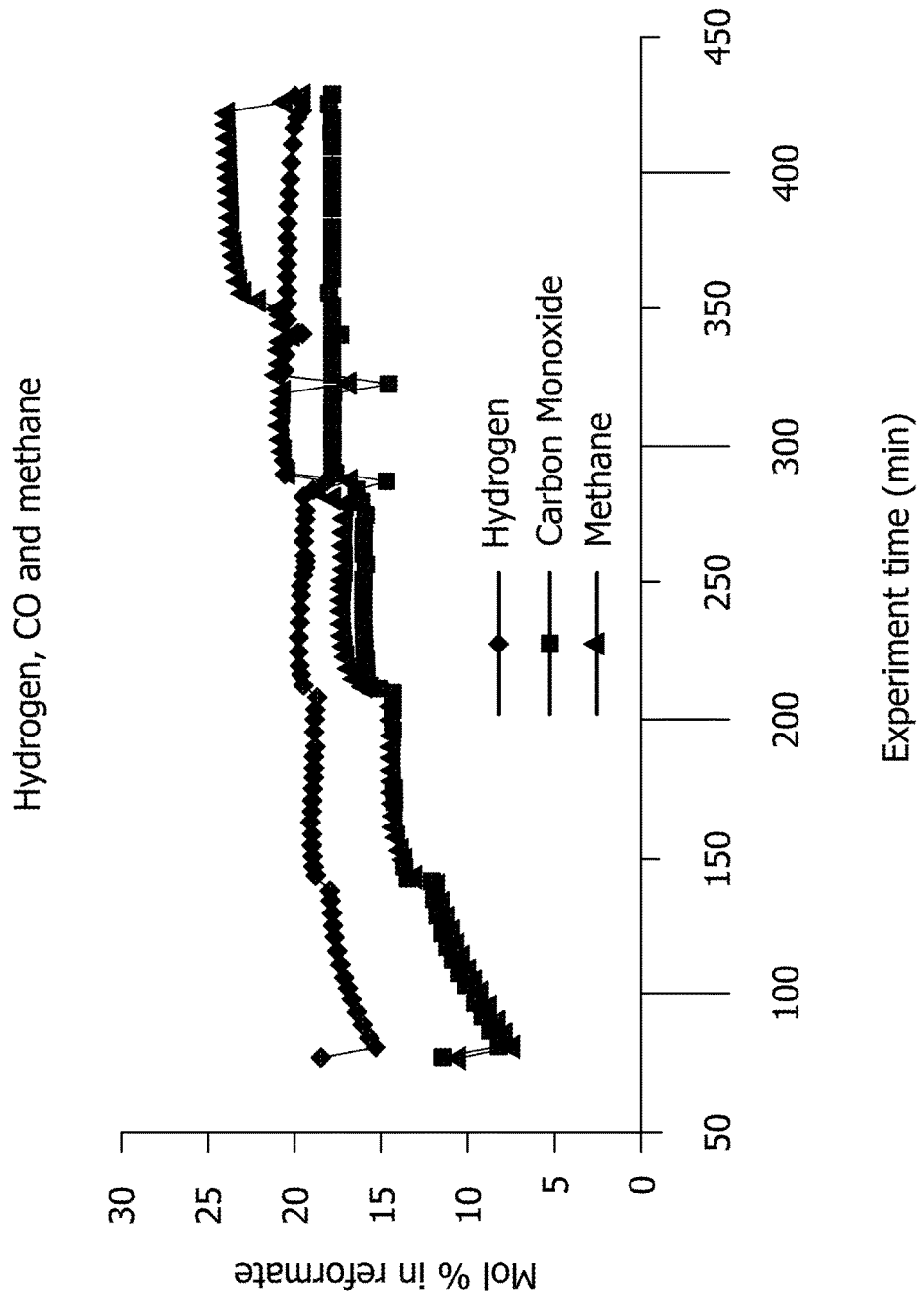
FIG. 21 is a graph illustrating reformer gaseous product distribution for the experiment of Example 5.

This Example demonstrates that methanation emerges when the catalyst temperature exceeds 350° C. The reactor and catalyst of Examples 3 and 4 were used with the ethanol and nitrogen flowrates and nitrogen temperatures given in Table 2. This data was obtained with copper mesh incorporated into the catalyst bed. With constant nitrogen temperature and flow, the steady decrease of ethanol flowrate led to steadily increasing catalyst temperatures and eventually to methanation. The data is shown in FIGS. 20 and 21.

TABLE 2

Reactor Conditions used in Example 5

| Experiment time (min) | Ethanol flowrate (ml/min) | $N_2$ temperature | $N_2$ flowrate (slpm) |
|---|---|---|---|
| 0-70 | 0 | 550° C. | 200 |
| 70-130 | 10 | 550° C. | 200 |
| 130-190 | 8 | 550° C. | 200 |
| 190-250 | 6 | 550° C. | 200 |
| 250-310 | 4 | 550° C. | 200 |
| 310-370 | 2 | 550° C. | 200 |
| 370-430 | 1 | 550° C. | 200 |
| 430-460 | 0 | No heat | 200 |

A dramatic increase in methane formation relative to other permanent gases ($H_2$ and CO) after the decrease in ethanol flow from 4 to 2 ml/min at 310 minute experiment time. Catalyst temperatures were about 390° C. at this point. A smaller increase in methanation is apparent at the previous flow change at 250 minutes with catalyst temperatures about 380° C.

Example 6

This Example describes the copper plating of 0.5% Pd/carbon pellet catalysts to produce catalysts useful in vertical tube array reformers. The substrate was a 0.5% Pd/carbon pellet reduced catalyst from Alfa Aesar, stock no. 38289, lot no. B23U050. The catalyst pellets were tabular in shape and packed loosely with a density of 0.42 g/cm3.

200 g of the catalyst was weighed out and the following solutions were prepared:
Copper Solution
68.3 g CuSO4.5H2O (0.27 mol, 17.3 g. copper)
400 ml of DI water
Tartrate Solution
270 g Rochelle salt (3.5 equivalents)
29 g Na2CO3 (1.0 equiv.)
66 g of 50% NaOH (3.0 equiv.)
1.0 L of DI water
Formaldehyde Solution
44 g. of 37% CH2O (2.0 equiv.)
56 ml DI water The copper and tartrate solutions were combined in a 4-liter beaker, yielding a rich blue-purple mixture. The Pd/C catalyst was added with gentle mechanical stirring, just sufficient to keep the granules suspended. Addition of the third solution, containing the reducing agent, began immediately in 10 ml portions (100 ml total) spaced 3 minutes apart. The pellets exhibited strong copper color shortly after the first addition.

Three minutes after the addition of the final portion of the reducing agent, the catalyst was recovered by filtration and rinsed with water. The pH at that time was 10.8. The catalyst was immediately recovered by filtration and rinsed with deionized water. The filtrate was still a strong blue color, although considerably weaker than the color of the original bath. A very small amount (certainly less than a gram) of copper fines were rinsed out of the catalyst and caught on the frit. No copper plating of the flask or agitator was seen.

The catalyst was usually dried and passivated by exposure to air before use in a reformer. In this case, the catalyst was dried at 120° C. under 24" Hg vacuum with nitrogen purge. 217.6 g were recovered. The passivation was conducted by stirring the catalyst in a metal pan with a spatula until heat evolution subsided. The pan was sprayed with water occasionally to prevent overheating.

Example 7

This Example describes the assembly of a vertical tube reformer using dry powder catalyst prepared via the procedure in Example 2 but using Raney nickel 4200® (W.R. Grace) that had been classified with a sieve to increase the mean particle size to 86 microns (versus 38 microns in the unclassified catalyst). The catalyst contained virtually no particles below 10 microns.

In addition to steel wool, three types of porous metal media were used in packing the reformer, all fabricated from Fecralloy. A metal foam type material, known as semi-sintered S-Mat (or simply "S-mat" in the tables below, was obtained from Micron Fibertech. This porous Fecralloy sheet was easily penetrated by powder catalyst.

Two types of Bekaert Bekipor sintered fiber mats were used (Bekaert Stainless Technologies, Kennesaw, Ga.). Type NPF-09013-000 with a one-inch thickness (21 mm, porosity 96.3%) is a lower density material in which powder catalyst could distribute itself. This is referred to below as "thick Bekaert." A ½-inch thick material, Bekaert type NPF-09012-000 (12 mm, porosity 93.8%) had a higher density and resisted penetration by the catalyst. It was used to block downstream movement of the powder catalyst. It is referred to a "thin Bekaert." Despite the names, both thick and thin Bekaert compressed to about the same density when packed in the reformer (about 1.2 cm). The normal sequence used in packing was "S-Mat," "Thick Bekaert," and "Thin Bekaert." This packing (from upstream to downstream) provides the density gradient found to be useful in maintaining dispersion of the catalyst.

In addition, disks of Fecralloy metal screen were used, primarily at the top bottom of the tubes. The tubes were packed from the top. Placing one or more metal screen disks at the bottom of the tubes provides a flat surface to support the load of the internals during insertion and while screens at the top or bottom also serve to avoid warping under compression caused by ethanol and reformate flow. The screen was obtained from Micron Fibertech and is known as "G-Mat."

Steel wool was used for the initial preheater-vaporizer section (the first tube bank) and to fill space in other places. In this and other Examples, the steel wool used was Type 316 Stainless Steel Wool Fine Grade from McMaster Carr, part #7364T81 or grade 0000 superfine steel wool (not stainless) McMaster Carr part no. 7363T51.

The reformer was of the design shown in FIGS. 10 and 11 with 4 tube banks and 10 tubes per bank. The tubes were 5 inches long with a wall thickness of 0.020 inches. After expansion, the outer diameter of the tubes was 1.0 inches.

Tube bank 1 (the vaporizer) was stuffed by first inserting 3 G-Mat disks followed by two rolled-up 5"×4" pieces of steel wool, followed by a final G-Mat for retention during welding. Banks 2, 3, and 4 each contained three catalyst stages with 2 g of classified copper-plated nickel sponge catalyst per stage. The packing sequence is given in the tables below.

TABLE 3

Sequence of internals for upflow catalyst tubes (banks 2 and 4)

| Stage | Components |
|---|---|
| Outlet (top) | 4-5 G-Mat |
| Exit Filter | 1 S-Mat |
|  | 1 Thick Bekaert |
|  | 1 Thin Bekaert |
| Cat Stage 3 | 2 g catalyst |
|  | S-Mat |
| Cat Stage 2 | Thin Bekaert |
|  | 2 g catalyst |
|  | S-Mat |
| Cat Stage 1 | Thin Bekaert |
|  | 2 g catalyst |
|  | S-Mat |
| Inlet (bottom) | Thin Bekaert |
|  | 3 G-Mat |

TABLE 4

Sequence of internals for downflow catalyst tubes (bank 3)

| Stage | Components |
|---|---|
| Inlet (top) | 4 G-Mat |
|  | S-Mat |
|  | Thin Bekaert |
| Cat Stage 1 | 2 g catalyst |
|  | S-Mat |
|  | Thin Bekaert |
| Cat Stage 2 | 2 g catalyst |
|  | S-Mat |
|  | Thin Bekaert |
| Cat Stage 3 | 2 g catalyst |
|  | S-Mat |
|  | Thin Bekaert |
| Outlet (bottom) | Thin Bekaert |
|  | 3 G-Mat |

Example 8

The reformer of Example 7 was mounted onto a 3-inch exhaust line carrying the exhaust from one 4-cylinder bank of a Ford 5.4 liter V8 engine. Anhydrous denatured ethanol was supplied to the reformer. Reformate passed into a buffer tank maintained at 4 bar gauge pressure. Reformate was analyzed by a gas chromatograph to determine conversion and selectivity. The accuracy of the conversion was confirmed by measurement of the amount of unreacted ethanol collected in the buffer tank.

The temperature of reformate exiting the reformer was monitored via a thermocouple inserted into the exit plenum. This temperature was maintained at setpoint by means of a custom dual butterfly valve controlled via a pneumatic actuator. This exhaust diverter valve located downstream of the reformer. A bypass exhaust line enabled a fraction of exhaust to bypass the reformer. The exhaust diverter valve controlled the fraction of exhaust allowed to bypass the reformer, thereby controlling the rate of heat transfer to the reformer from exhaust. The reformate exit temperature setpoint was generally 325-350° C., and there was little effect of temperature on conversion and selectivity in this range.

The reformer of Example 7 was operated using ethanol flowrates varying from 0.5 to 4.5 kg/hour. Backpressure varied from 700 to 2300 kPa over this flow range, including the 400 kPa due to the downstream buffer tank. Backpressure was stable after the first 70 hours and did not increase thereafter. Conversion of ethanol was about 90% over the flow range. Conversion of acetaldehyde to CO and methane varied from 60-90%.

Example 9

This Example demonstrates the utility of alternating stages of copper-plated Pd/C pellets and copper-plated nickel sponge powder for ethanol reforming in a vertical tube array reformer. In addition, this Example shows that even using only about half of the available volume for catalyst, high conversion can be achieved. Thus the size of the reformer can be halved with commensurate improvement in cost and heatup time. The design and dimensions of the reformer were the same as in Example 7, but the packing scheme was different.

The powder catalyst was prepared by the method of Example 2, but using Raney nickel 4200® instead of Raney nickel 2800®. Both products are from W.R. Grace. The powder catalyst was not classified. The Cu/Pd/carbon pellet catalyst was prepared by the method of Example 6 using a 1.0% Pd/carbon pellet substrate, Noblyst 1006 (Evonik). Separate stages of these two catalysts were used in the reformer.

In order to use only about half of the available volume, bank 4 was stuffed with steel wool. The packing sequence for tube banks 2, 3, and 4 is shown in the tables below. Much of the volume of these tubes was also stuffed with steel wool.

TABLE 5

Sequence of internals for tube bank 1 (downflow), full depth is 13 cm

| Stage | Element | Depth (cm) |
|---|---|---|
| Inlet (top) | 1 G-Mat | 0 |
| Preheat | Steel wool rolls | 0.2 |
| Cat Stage 1 | 9 g Cu/Pd/C pellets | 7.8 |
|  | Thin Bekaert | 11.4 |
| Outlet (bottom) | 2 G-Mat | 12.8 |

TABLE 6

Sequence of internals for tube bank 2 (upflow), full depth is 13 cm

| Stage | Components | Depth (cm) |
|---|---|---|
| Outlet (top) | 2 G-Mat | 0 |
| Cat Stage 2 | 9 g Cu/Pd/C pellets | 0.1 |
|  | Thin Bekaert | 4.1 |
| Cat Stage 1 | Thick Bekaert | 5.4 |
|  | 9 g Cu/Ni 4200 | 6.9 |
|  | Thin Bekaert | 7.0 |
| Inlet (bottom) | 4" × 4" steel wool roll | 8.0 |
|  | 2 G-Mat | 12.7 |

TABLE 7

Sequence of internals for tube bank 3 (downflow), full depth is 13 cm

| Stage | Element | Depth (cm) |
|---|---|---|
| Inlet (top) | 1 G-Mat | 0 |
|  | Steel wool rolls | 0.2 |
|  | Thin Bekaert | 6.5 |
| Cat Stage 1 | 9 g Cu/Ni 4200 | 8.4 |
|  | S-Mat | 8.7 |
|  | Thick Bekaert | 9.9 |
|  | Thin Bekaert | 11.4 |
| Outlet (bottom) | 2 G-Mat | 12.7 |

Example 10

This Example describes testing of the reformer of Example 9 using the same procedure as Example 8, except that the ethanol flow range was 0.5 to 2.5 kg/hr. Backpressure rose initially and was stable after 75 hours at 1200-2500 kPa including 400 kPa due to the buffer tank. Conversion of ethanol was about 90% over the flow range. Conversion of acetaldehyde to CO and methane was about 90% up to 1.5 kg/hr ethanol flow and about 70% at the higher flowrates.

Example 11

This Example describes packing a finned-tube reformer of the type described in the specification with the copper-plated nickel sponge catalyst of Example 2 which was impregnated into disks of Bekipor Type NPF-09013-000 ("thick Bekaert") with a roller mill. A 36-inch finned tube with an outer diameter of 1.5 inches, a wall thickness of 0.065 inches with 8 fins per inch arranged in a spiral pattern was used for a reformer of the design shown in FIG. 4. The fin height was 0.45 in. and fin thickness was 0.014 in. The fins were applied in 3-inch intervals alternating with 1-inch plain sections. The exhaust sleeve outer diameter was 2.625±0.01 in. with a wall thickness of 0.065 in.

The catalyst impregnated into thick Bekaert ("catalyst stacks") was inserted into the finned tube alternating with insertable baffles which created an alternating upflow-downflow pattern. The packing sequence is given in the table below.

TABLE 8

| Packing Sequence | | |
|---|---|---|
| Reformer Stage | Component | Baffles |
| Vaporizer | Thin Bekaert |  |
|  | Rolled SS-wool (7 cm) |  |
|  | Rolled SS-wool (7 cm) |  |
|  | Rolled "fine" SS-wool (7 cm) |  |
|  | Thin Bekaert |  |
|  |  | Bottom cut baffle |
| 1 | Cat stack (11.7 g cat) |  |
|  |  | Top cut baffle |
| 2 | Cat stack (12.2 g cat) |  |
|  |  | Bottom cut baffle |
| 3 | Cat stack (14.5 g cat) |  |
|  |  | Top cut baffle |
| 4 | Cat stack (15.4 g cat) |  |
|  |  | Bottom-cut baffle |
| 5 | Cat stack (11.0 g cat) |  |
|  |  | Top cut baffle |

TABLE 8-continued

| Packing Sequence | | |
|---|---|---|
| Reformer Stage | Component | Baffles |
| 6 | Cat stack (12.6 g cat) |  |
|  | Cat stack (12.1 g cat) |  |
|  |  | Bottom cut baffle |
|  | Thick Bekaert |  |
|  |  | Top cut baffle |
| 7 | Cat stack (11.1 g cat) |  |
|  | Cat stack (8.5 g cat) |  |
|  |  | Bottom cut baffle |
| 8 | Cat stack (11.7 g cat) |  |
|  |  | Top cut baffle |
| 9 | Cat stack (13.1 g cat) |  |
|  |  | Bottom cut baffle |
| 10 | Cat stack (13.2 g cat) |  |
|  |  | Top cut baffle |
| 11 | Cat stack (21.7 g cat) |  |
|  |  | Bottom cut baffle |
| 12 | Cat stack (16.3 g cat) |  |
|  |  | Top cut baffle |
| 13 | Cat stack (14.6 g cat) |  |
|  | Cat stack (14.8 g cat) |  |
|  |  | Bottom cut baffle |
| 14 | Cat stack (18.1 g cat) |  |
|  |  | Top cut baffle |
| 15 | Cat stack (19.5 g cat) |  |
|  |  | Bottom cut baffle |
| 16 | Cat stack (20.1 g cat) |  |
|  |  | Top cut baffle |
| 17 | Cat stack (15.2 g cat) |  |
|  |  | Bottom cut baffle |
| 18 | Cat stack (15.2 g cat) |  |
|  |  | Top cut baffle |
| 19 | Cat stack (17.0 g cat) |  |
|  |  | Bottom cut baffle |
| 20 | Cat stack (13.0 g cat) |  |
|  |  | Top cut baffle |
| 21 | Cat stack (14.0 g cat) |  |
|  |  | Bottom cut baffle |
| 22 | Cat stack (11.1 g cat) |  |
|  |  | Top cut baffle |
| Final filter | Thick Bekaert |  |
|  | Thick Bekaert |  |
|  | Thick Bekaert |  |

Example 12

This Example describes testing of the reformer of Example 11 using the same procedure as Example 8, but with an ethanol flowrate of 0.5 kg/hr. The reformer was operated for over 250 hours. Ethanol conversion was above 90% and steady throughout the test. Conversion of acetaldehyde to CO and methane was about 50%. Pressure increased throughout the test, reaching 2800 kPa after 250 hours, including 400 kPa due to the buffer tank.

Example 13

This Example describes packing of the three-bank vertical tube array reformer shown in FIGS. 13-15 and 17. The catalysts used were air-passivated copper plated nickel sponge powder catalyst and Cu/1% Pd/C pellets prepared similarly to those in Examples 2 and 6. The substrates used for catalyst preparation was B 113W nickel sponge and Noblyst 1009 1% Pd/C, both from Evonik Industries, Parsippany, N.J. 119 g of the pellet catalyst and 105 g of the metal sponge powder were used.

All tubes were utilized in upflow mode due to the shunt tubes incorporated into the design, as discussed above. The shunt tubes were loosely packed with steel wool to provide enhanced heat transfer. Steel wool was also used in the first bank for ethanol preheat. The catalyst and other internals added 0.58 kg to the reformer mass. Total reformer mass was 5.4 kg including exhaust stubs.

The packing utilized two metal mesh materials from Bekaert that were not used in the Examples above. Bekaert 30CL3 is a thin, flexible metal mesh that serves as a final stage filter or, when positioned at the bottom of a powder catalyst stage, prevents powder from falling into the plenum when the reformer is not in operation. Bekaert 12003 is a thinner depth filter which also provides heat transfer.

TABLE 9

Bank 1

| Stage | Components | Depth (cm) |
|---|---|---|
| Pellet stage | 1 or 2 G-Mat | 0.0 |
| | 3 g pellets | — |
| | 4 G-Mat | 1.9 |
| | 3 g pellets | — |
| | 1 G-Mat | 3.8 |
| Inlet (bottom) | Steel wool roll | 3.8 |
| | G-Mat | 7.5 |

TABLE 10

Bank 2

| Stage | Components | Depth (cm) |
|---|---|---|
| Pellet stage | 1 G-Mat | 0.0 |
| | 4 g pellets | 0.1 |
| | 1 G-Mat | 2.2 |
| | 3 g pellets | 2.2 |
| Powder stage | Bekaert 12003 | 3.8 |
| | 1 G-Mat | 4.2 |
| | S-Mat | 4.3 |
| | 3 g powder | |
| | 1 G-Mat | 5.9 |
| | S-Mat | 6.0 |
| | 3 g powder | |
| | Bek. 30CL3 | 7.7 |
| | 1 G-Mat | 7.8 |

TABLE 11

Bank 3

| Stage | Components | Depth (cm) |
|---|---|---|
| Exit filter | G-Mat | 0.0 |
| | Bekaert 12003 | 0.1 |
| Powder stage 3 | S-Mat | 0.9 |
| | 1 G-Mat | 1.9 |
| | 3 g powder | — |
| Powder stage 2 | S-Mat | 2.2 |
| | 1 G-Mat | 3.4 |
| | 3 g powder | — |
| Pellet stage | Bek. 30CL3 | 3.9 |
| | G-Mat | 4.0 |
| | 4 g pellets | — |
| Powder stage 1 | Bek. 30CL3 | 5.9 |
| | S-Mat | 6.1 |
| | 3 g powder | |
| | Bek. 30CL3 | 7.7 |
| | 1 G-Mat | 7.8 |

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. An alcohol reformer comprising:
a conduit having an axis and including a wall having an exterior surface and an interior surface at least partially defining an interior chamber through which alcohol vapor flows along an alcohol flow path, the conduit wall comprising a thermally conductive material;
a plurality of fins extending generally radially outward from the exterior surface of the conduit wall, the fins comprising thermally conductive material, wherein the fins and the conduit wall are in thermal contact;
a catalyst stage in the interior chamber of the conduit having a length extending along the axis, wherein the catalyst stage is configured to allow alcohol vapor to flow through the catalyst stage along the alcohol flow path, the catalyst stage including
an alcohol reforming catalyst, and
a heat transfer member comprising thermally conductive material, wherein the heat transfer member is in thermal and physical contact with the conduit wall and the alcohol reforming catalyst along the length of the catalyst stage, whereby heat is transferable from the plurality of fins to the alcohol reforming catalyst along the length of the catalyst stage to enable reforming of the alcohol vapor as it flows through the catalyst stage;
a reheat stage in the interior chamber of the conduit and configured to allow alcohol vapor to flow through the reheat stage along the alcohol flow path, the reheat stage comprising a second heat transfer member, wherein the second heat transfer member is in thermal contact with the conduit wall, whereby heat is transferable from the plurality of fins to the second heat transfer member to enable heating of the alcohol vapor as it flows through the reheat stage;
a baffle disposed in the interior chamber of the conduit between the catalyst stage and the reheat stage, the baffle configured to direct the alcohol vapor through the catalyst stage in a first direction and direct the alcohol vapor through the reheat stage in a second direction that is opposite the first direction.

2. The alcohol reformer set forth in claim 1, wherein the heat transfer member of the catalyst stage comprises at least one of metal wool, foam, and mesh.

3. The alcohol reformer set forth in claim 1, wherein the reforming catalyst comprises at least one of copper-plated metal sponge, copper-plated palladium or platinum on carbon pellets, or a combination thereof.

4. The alcohol reformer set forth in claim 1, wherein the conduit includes a plurality of conduits arranged side-by-side in at least one bank in the alcohol flow path.

5. The alcohol reformer set forth in claim 4, wherein said at least one bank includes at least first and second banks of conduits, wherein the first bank is upstream of the second bank along the alcohol flow path.

6. The alcohol reformer set forth in any of claims 5 in combination with a reformer housing defining a generally horizontal exhaust channel through which exhaust gas flows along an exhaust gas path, wherein the alcohol reformer is received in the exhaust channel such that the interior chamber of the conduit is sealed from the exhaust channel and exhaust gas flowing through the exhaust channel is in thermal contact with the fins.

7. The alcohol reformer set forth in claim 6, wherein the conduits of the first and second banks are oriented generally vertically in the exhaust channel and the alcohol flow path through the conduits in each of the first and second banks is in one of a downflow direction and an upflow direction.

8. The alcohol reformer set forth in claim 7, wherein the alcohol flow path through the conduits in the first bank is in the upflow direction, and wherein the alcohol flow path through the conduits in the second bank is in the upflow direction.

9. The alcohol reformer set forth in claim 8, wherein the reformer housing at least partially defines first lower inlet plenum supplying alcohol vapor to the first bank of conduits, a first upper outlet plenum receiving alcohol vapor from the conduits of the first bank, a shunt conduit in fluid communication with the first upper outlet plenum for receiving alcohol vapor from the first upper outlet plenum, a second lower inlet plenum in fluid communication with shunt conduit for receiving alcohol vapor from the shunt conduit, and a second upper outlet plenum for receiving alcohol vapor from the conduits of the second bank.

10. The alcohol reformer set forth in claim 7, wherein the alcohol flow path through the conduits in the first bank is in a direction opposite a direction of the alcohol flow path through the conduits in the second bank.

11. The alcohol reformer set forth in claim 6, wherein said at least one bank further includes at least a third bank of conduits, wherein the third bank of conduits is downstream of the second bank along the alcohol flow path.

12. The alcohol reformer set forth in claim 7, wherein the reheat stage is upstream of the catalyst stage along the alcohol flow path.

13. The alcohol reformer set forth in claim 1, wherein the reheat stage is upstream of the catalyst stage along the alcohol flow path.

14. The alcohol reformer set forth in claim 1, wherein the reheat stage is downstream of the catalyst stage along the alcohol flow path.

15. The alcohol reformer set forth in claim 14, wherein the reheat stage comprises a plurality of second heat transfer members of different porosity to form a porosity gradient.

16. An alcohol reformer comprising:
a conduit having an axis and including a wall having an exterior surface and an interior surface at least partially defining an interior chamber through which alcohol vapor flows along an alcohol flow path, the conduit wall comprising a thermally conductive material;
a plurality of fins extending generally radially outward from the exterior surface of the conduit wall, the fins comprising thermally conductive material, wherein the fins and the conduit wall are in thermal contact;
a catalyst stage in the interior chamber of the conduit having a length extending along the axis, wherein the catalyst stage is configured to allow alcohol vapor to flow through the catalyst stage along the alcohol flow path, the catalyst stage including
an alcohol reforming catalyst, and
a heat transfer member comprising thermally conductive material, wherein the heat transfer member is in thermal and physical contact with the conduit wall and the alcohol reforming catalyst along the length of the catalyst stage, whereby heat is transferable from the plurality of fins to the alcohol reforming catalyst along the length of the catalyst stage to enable reforming of the alcohol vapor as it flows through the catalyst stage;
a reheat stage in the interior chamber of the conduit and configured to allow alcohol vapor to flow through the reheat stage along the alcohol flow path, the reheat stage comprising a second heat transfer member, wherein the second heat transfer member is in thermal contact with the conduit wall, whereby heat is transferable from the plurality of fins to the second heat transfer member to enable heating of the alcohol vapor as it flows through the reheat stage,
wherein the reheat stage is downstream of the catalyst stage along the alcohol flow path,
wherein the second heat transfer member comprises a plurality of second heat transfer members, and wherein the plurality of second heat transfer members comprising different porosities forming a porosity gradient.

17. The alcohol reformer set forth in claim 1 in combination with a reformer housing defining an exhaust channel through which exhaust gas flows along an exhaust gas path, wherein the catalyst stage and the reheat stage are received in the exhaust channel.

18. The alcohol reformer set forth in claim 1, wherein the catalyst stage and the reheat stage are linearly aligned along the interior chamber of the conduit.

* * * * *